(12) United States Patent
Kang et al.

(10) Patent No.: US 9,287,551 B2
(45) Date of Patent: Mar. 15, 2016

(54) METHOD FOR MANUFACTURING A BATTERY TERMINAL PLATE

(75) Inventors: Tae In Kang, Incheon (KR); Young Su Kim, Jeonbuk (KR); Doo Sun Choi, Incheon (KR)

(73) Assignees: Tae In Kang, Incheon (KR); Young Su Kim, Jeonbuk (KR)

( * ) Notice: Subject to any disclaimer, the term of this patent is extended or adjusted under 35 U.S.C. 154(b) by 286 days.

(21) Appl. No.: 13/984,486

(22) PCT Filed: Feb. 24, 2012

(86) PCT No.: PCT/KR2012/001445
§ 371 (c)(1),
(2), (4) Date: Aug. 8, 2013

(87) PCT Pub. No.: WO2012/118306
PCT Pub. Date: Sep. 7, 2012

(65) Prior Publication Data
US 2013/0333210 A1    Dec. 19, 2013

(30) Foreign Application Priority Data

Feb. 28, 2011  (KR) .................. 10-2011-0017642
Feb. 16, 2012  (KR) .................. 10-2012-0015672

(51) Int. Cl.
*H01R 43/16*    (2006.01)
*H01M 2/30*    (2006.01)
*H01M 10/0525*    (2010.01)

(52) U.S. Cl.
CPC .............. *H01M 2/30* (2013.01); *H01M 2/305* (2013.01); *H01M 10/0525* (2013.01); *H01M 2220/20* (2013.01); *Y02E 60/122* (2013.01); *Y02T 10/7011* (2013.01); *Y10T 29/49204* (2015.01)

(58) Field of Classification Search
CPC .................. Y10T 29/49108; Y10T 29/53135; Y10T 29/49204; Y10T 29/49934; Y10T 29/53996; H01M 2/30; B21J 5/027; G06K 19/07743
USPC ............ 29/874, 33 M, 33 A, 623.1, 747, 882; 72/42, 68, 125, 126, 286, 327, 357
See application file for complete search history.

(56) References Cited

U.S. PATENT DOCUMENTS

| | | | |
|---|---|---|---|
| 5,349,840 A | 9/1994 | Ratte et al. | |
| 5,791,183 A | 8/1998 | Spiegelberg et al. | |
| 6,688,148 B1 * | 2/2004 | Hartzell | ..................... B21J 1/06 148/599 |
| 7,946,033 B2 * | 5/2011 | Gibellini | .................. B21J 9/022 29/33 M |

FOREIGN PATENT DOCUMENTS

JP    2008-521183    6/2008

* cited by examiner

*Primary Examiner* — Thiem Phan
(74) *Attorney, Agent, or Firm* — IP & T Group LLP

(57) ABSTRACT

The present invention relates to an apparatus and method for manufacturing a battery terminal plate, and more particularly relates to an apparatus and method for manufacturing a battery terminal plate, in which a terminal plate for a secondary battery, such as a middle or large sized Lithium ion battery, which is applied to electric vehicles, hybrid vehicles, plug-in hybrid vehicles, solar cells, electric tools and so on, is processed by not pressing but forging, a shifting and supplying apparatus for shifting a material to be processed in each forming and processing step may be moved by the shortest distance through a shift-return method (one step shift-return), the material is previously processed by punching so as not to satisfy a standard of a design, and the firstly processed material is secondly processed to satisfy the standard.

5 Claims, 26 Drawing Sheets

METHOD FOR MANUFACTURING A BATTERY TERMINAL PLATE

This application is a national stage application of PCT/KR2012/001445 filed on Feb. 24, 2012, which claims priorities of Korean patent application number 10-2011-0017642 filed on Feb. 28, 2011 and Korean patent application number 10-2012-0015672 filed on Feb. 16, 2012. The disclosure of each of the foregoing applications is incorporated herein by reference in its entirety.

TECHNICAL FIELD

The present invention relates to an apparatus and method for manufacturing a battery terminal plate, and more particularly relates to an apparatus and method for manufacturing a battery terminal plate, in which a terminal plate for a secondary battery, such as middle or large sized Lithium ion batteries, which is applied to electric vehicles, hybrid vehicles, plug-in hybrid vehicles, solar cells, electric tools and so on, is processed by not pressing but forging, a shifting and supplying apparatus for shifting a material to be processed in each forming and processing step may foe moved at the shortest distance through a shift-return method (one step shift-return), the material is previously processed by punching it so as not to satisfy a standard of a design, and the firstly processed material is secondly processed to satisfy the standard.

BACKGROUND ART

A future competitive power in a vehicle market may be changed depending on a development of an environment-friendly vehicle as environmental regulations become strict. With interests in the environment-friendly vehicle growing since the 1990s, vehicles named hybrid cars have been developed and have become available commercially.

The hybrid car is a complex vehicle which has an internal combustion engine and an electric motor as like a meaning of the word hybrid, which means "mixed breed" or "mixed blood". A low speed driving of the hybrid car is performed by the electric motor until the hybrid car increases its velocity up to a desirable velocity after starting, at which point the internal combustion engine operates primarily and the electric motor operates as an auxiliary power so as to increase speed during acceleration of the hybrid car. During a reduction of the velocity of the hybrid car, a generator is operated by inertial force so that kinetic energy of the hybrid car is converted info electric energy and stored in a battery. On the other hand, electric vehicles have been developed in which an electric power charged in batteries operates one or more electric motors so that the electric vehicles can be driven.

The batteries mounted on the hybrid cars and the electric cars as described above are charged by electricity generated through electrolysis of a positive electrode and a negative electrode. That is, the batteries are secondary Lithium ion batteries in which two electrodes of a positive electrode (copper) and a negative electrode (aluminum) are spaced apart from each other in a state of being submerged in a solution including positive ions and negative ions.

The positive electrode and the negative electrode constituting the battery of the electric vehicle are received in a housing (can) of the battery, which are respectively welded by a laser to terminals which are fixed by screws to a cap plate for isolating an opening portion of the housing of the battery. At this time, the terminals have a connection end, to which the positive electrode is fitted and fixed, integrally formed at a side thereof, and a screw portion, which is combined with a nut and fixed to the housing while providing an end connected to an external electric wire, at the other side thereof, respectively. The battery terminal as described above is assembled with a separate battery terminal plate. In a method of manufacturing a conventional battery terminal plate, a material to be processed and to have a volume is shifted to several press machines while being processed through several pressing processes to be formed with a basic shape. Then, unnecessary portions of the material are cut off, and a surface of the material is processed. The manufacturing of the battery terminal plate is then finished.

However, in the conventional method of manufacturing, there is a problem in that a shifting path of the material to be processed becomes longer and productivity of a battery terminal plate is deteriorated since the material to be processed is shifted to several pressing machines and processed. Further, in a case of the conventional pressing process, there are problems in that scraps which are metal fragments generated when a metal product is manufactured from a material to be processed or which are wastes of a metal product highly increase, and especially a fractured surface or a broken line is generated. In a case where a material to be processed has a large volume itself, the material is overflowed from the press machine and generates unnecessary scraps. In order to remove the scraps, a step of cutting the scraps through a separate barreling process (stones, water and a product in which unnecessary burrs on surfaces of the product are intended to be cut are put into a hexagonal barrel all together, and the barrel is rotated at a high speed so as to cut the unnecessary burrs) and a step of cleaning and smoothly finishing surfaces of the product must be perforated. Therefore, there is a disadvantage in that it takes a long time to perform a manufacturing process so that a manufacturing time and a manufacturing cost increase.

Especially, where an opening is formed in a material by punching the material according to the conventional art, there is a problem in that the above-mentioned fractured surface or broken line is always formed. Moreover, the battery terminal plates manufactured by the conventional method of manufacturing the battery terminal plate have irregular sizes and rough surfaces, thereby causing incomplete surface coating. Therefore, if a battery part is connected or fixed to the battery terminal plate, it has an effect on a product property, so as to deteriorate the quality of product, and causing an increase of friction.

DETAILED DESCRIPTION OF THE INVENTION

Technical Problem

The present invention has been made to solve the above-mentioned problems, and an aspect of the present invention is to provide an apparatus and method for manufacturing a battery terminal plates, in which the terminal plate for a secondary middle or large Lithium ion battery which is applied to an electric vehicle, a hybrid vehicle, a plug-in hybrid vehicle, a solar cell, electric tools and so on, is manufactured by not a pressing process but a forging process so that a shifting path of a material to be processed and a processing machine according to a forming process becomes the shortest distance.

Another aspect of the present invention is to provide an apparatus and method for manufacturing a battery terminal plate, in which a shifting path of a shifting and supplying apparatus for supplying and shifting a material to a step of forming and processing the material is made to be the shortest distance through a shift-return method (one step shift-return), the material is previously processed by punching so as not to satisfy a standard of a design, and the firstly processed material is secondly processed to satisfy the standard.

Technical Solution

In order to achieve the object of the present invention, according to an aspect of the present invention is to provide a method of manufacturing a battery terminal plate, in which a material constituted of a volume is formed to have a previously designed shape while being pressed several times. The method includes the steps of: (S10) cutting a material 1, which is continuously supplied, at a predetermined length by a cutting and supplying portion 11 and supplying the cut material to a first processing device 1; (S20) firstly forming the cut material 1 with an incomplete shape in such a manner that a first press die 13 presses the cut material 1 to a first fixed die 14; (S30) secondly forming the cut material 1 with a basic shape in such a manner that a second press die 15 secondly presses the cut material to the first fixed die 14 in a state that the cut material 1 remains in the first fixed die 14 before the basic shaped material 1 is elected from the first fixed die 14 and moved to a second fixed die 16 so as to be inserted in the second fixed die 16; (S40) thirdly forming the basic shaped material 1 with a complete shape in such a manner that a third press die 17 presses the second fixed die 16 before the complete shaped material 1 is discharged from the second fined die 16; and (S50) fourthly forming a complete battery terminal plate through a trimming process after the complete shaped material 1 is fixed.

In accordance to another aspect of the present invention, a method of manufacturing a battery terminal plate, in which a material having a predetermined volume is pressed several times while forming a designed shape, is provided. The method includes the steps of: (S100) supplying a material to an initial processing position between a fixed die portion 120 and a press die portion 130 which provide forming positions in steps, in which the material 1 which is continuously supplied is picked up by a shifting and supplying device 170; (S200) pressing and forging the material 1 while the material 1 placed at the initial position is inserted into the fixed die portion 120 by the press die portion 130; (S300) shifting the material 1 from a fixed die portion 120 positioned at the initial processing position to a next fixed die portion 120, while the shifting and supplying device 170 supplies a next material 1 to the initial processing position; (S400) continuously forming the material 1 with a shape by continuously performing the pressing and forging step S200 and the shift step S300 from a first processing step to an $n^{th}$ processing step; (S500) trimming a part of the material 1 by a first trimming device 150 so that the material 1 does not satisfy a standard of a design, when the shifting and supplying device 170 shifts the formed material 1 to the first trimming device 150 provided to a stage next to the fixed die portion 120; and (S600) finally trimming the formed material 1 by a second trimming device 160 so that the material 1 satisfies a standard of the design, when the shifting and supplying device 170 shifts the material 1, which is trimmed in a first trimming step, to the second trimming device 160 provided to a next stage.

In accordance to another aspect of the present invention, an apparatus 100 for manufacturing a battery terminal plate by pressing a material 1 with a volume several times to form a battery terminal plate with a previously designed shape is provided. The apparatus 100 includes a forging and forming device 110 in which a movable die presses a material 1 so as to forge the material, the moving die being associated with fixed dies which are respectively and sequentially provided in steps; a trimming device 140 which is provided next to the forging and forming device 110 so as to firstly cut a previously designed part of the material 1, which is formed by a punching operation, not to meet a standard of a design, and which finally cuts the material to meet a standard of the design; and a shifting and supplying device 170 which is arranged at a sequential processing position from a forming position of the forging and forming device 110 to a cutting processing position of the trimming device 140, the shifting and supplying device 170 picking up and shifting the material 1 to a next processing step and returning to an initial position.

Advantageous Effects

The terminal plate for a secondary middle or large sized Lithium ion battery which is applied to an electric vehicle, a hybrid vehicle, a plug-in hybrid vehicle, solar cells, electric tools and the like, is manufactured by not a pressing method but a forging method, and a shifting path of the material and a processing apparatus according to a forming process becomes the shortest distance, thereby increasing a productivity of the battery terminal plate.

Further, according to the present invention, the material is firstly tension-pressed to have an incomplete shape, secondly tension-pressed to have a basic shape, and thirdly pressed to have a complete shape. Then, the battery terminal plate is finally formed by performing a process of cutting scraps or removing fractured surfaces generated due to an overflow or a lack of material.

On the other hand, according to the present invention, the shifting path of the shift and supply apparatus for shifting and supplying a material to each forming and processing step is made to become the shortest distance through the shift return method (one step shift-return), thereby reducing a forming time and a process standby time and improving productivity.

Furthermore, according to the present invention, a supplying and shifting operation of the supplying and shifting apparatus for shifting the material to several forming and processing steps is associated with a punching operation of a press die portion for a fixed die portion. Therefore, a plurality of forming and processing steps may be accomplished through a shifting operation and a punching operation, and a continuity of the process can be secured so as to improve the productivity.

Moreover, according to the present invention, an external portion of the formed material is firstly processed by punching not to satisfy a standard of a design, and finally processed to satisfy a standard, thereby removing fractured surfaces or broken lines of the processed portion. A completed product having a clean appearance can be manufactured without an additional process of treating an appearance of the product after a remote shift of the product.

MODE FOR CARRYING OUT THE INVENTION

Hereinafter, the embodiments of the present invention will be described in detail with reference to the accompanying drawings.

Figure 1:
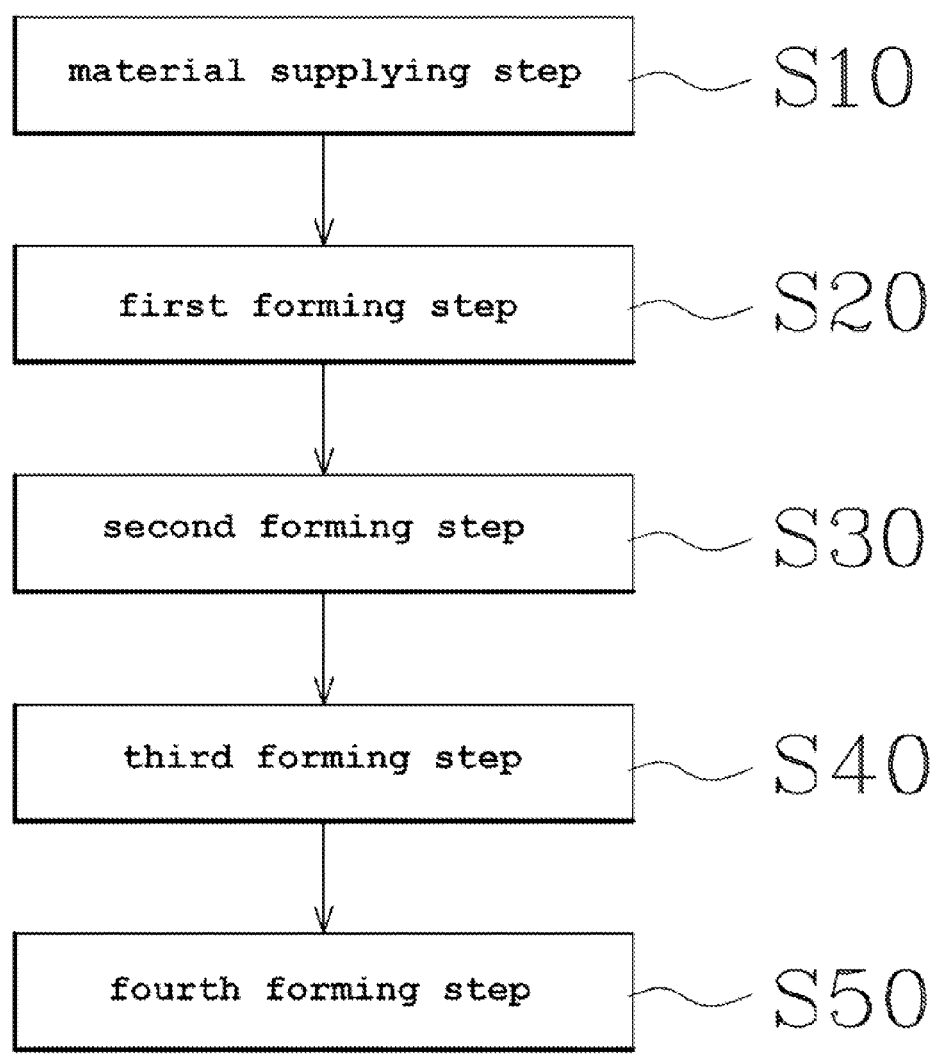
FIG. 1 is a block diagram illustrating a method of manufacturing a battery terminal plate in stages according to an embodiment of the present invention.

A method of manufacturing a battery terminal plate according to an embodiment of the present invention will be described. As shown in FIG. 1, in order to achieve the object of the present invention, a method of manufacturing a battery terminal plate, in which a material having a predetermined volume is pressed several times while forming a designed shape, is provided. The method includes the steps of: (S10) cutting a material, which is continuously supplied in a form of a wire, by a predetermined length by means of a cutting and supplying portion 11 so as to supply the cut material to a first processing apparatus 12; (S20) firstly pressing the cut material, which is supplied to the first processing apparatus 12, by means of a first press die 13 and a first fixed die 14 while holding a tension of the material so as to make the material have the incomplete shape; (S30) secondly pressing the semi-product of the material 1, which is placed in the first fixed die 14, by a second press die 15 so as to form the basic shaped material 1, and then ejecting the material 1 from the first fired die 14 and moving the material 1 to a second fixed die 16 so that the material 1 is inserted in the second fixed die 16; (S40) thirdly making the material have a complete shape by allowing a third press die 17 to press the material in the second fixed die 16, and discharging the material; and (S50) fourthly forming the material through finishing processes as well as the pressing processes after fixing the discharged material 1, so as to achieve a complete battery terminal plate.

With apparatuses for performing a method of manufacturing a battery terminal plate, that is, steps of manufacturing the battery terminal plate, the first fixed die 14 and the second fixed die 16 may be fixed dies which are placed up and down or left and right at a predetermined distance, and the first, second and third press dies 13, 15 and 17 are fixed to one fixing block 18, press the material 1 to the first and second fixed dies 14 and 16 by means of one press driving device (not shown) and move the material 1 from the first fixed die 13 to the second fixed die 16 by means of a material moving device (not shown). Here, each die is provided at a center portion with an ejector which is driven by a separate driving apparatus and which pushes and separates the material 1 from the die or to prevent the material from being separated from a corresponding die. Here, the first press die 13 may be a tension press apparatus in which a pressing body (a die) at a leading end of an external housing is elastically repelled by a spring. As described above, the die driving device and the material moving device of the first, second and third pressing dies 13, 15 and 17 may be a driving device such as a piston moving in a cylinder, which linearly performs a reciprocating movement. In the description, the ejector is also operated by a piston moving in a cylinder, and may be operated by a device performing a linearly reciprocating movement.

Figure 2A:
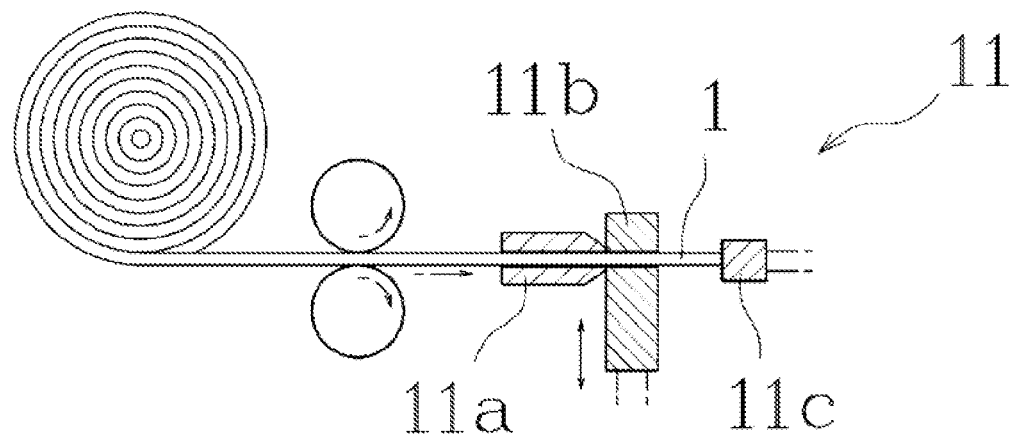
FIGS. 2A and B are views illustrating a step of supplying a material and an operation according to the embodiment of the present invention.
Figure 2B:
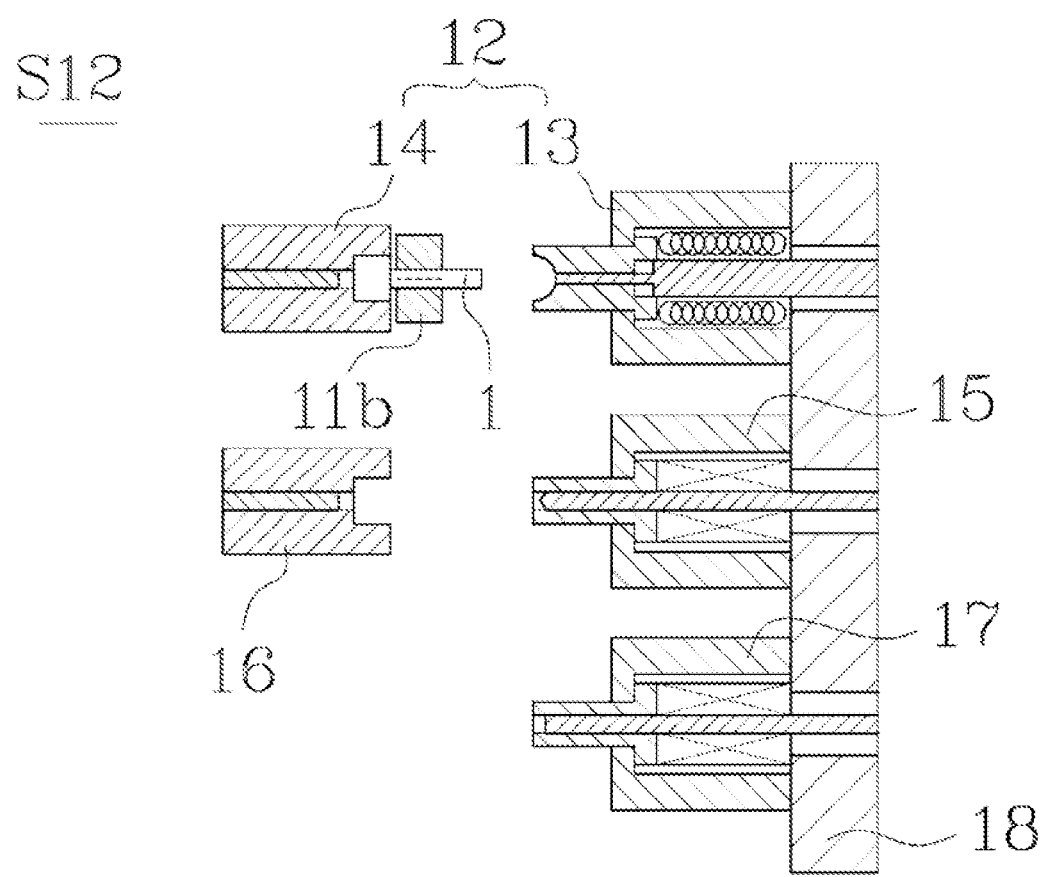

Hereinafter, the method of manufacturing the battery terminal plate according to the present invention will be described in steps. Firstly, as shown in FIGS. 2A and 2B, the step (S10) of supplying the material includes sub-steps of (S11) supplying the material 1 such as a wire through a pair of rollers, and a supporting die 11a and a transferring die 11b which have through holes formed therein respectively until the material is stopped by a stopper 11C, and (S12) cutting the material 1 at a boundary of the supporting die 11a and the transferring die lib by moving the transferring die 11b upwardly when the supply of the material 1 is stopped, and transferring the material 1 between the first press die 13 and the first fixed die 14 which constitutes the first forming device 12. At this time, the material 1 may be an aluminum wire.

Figure 3A:
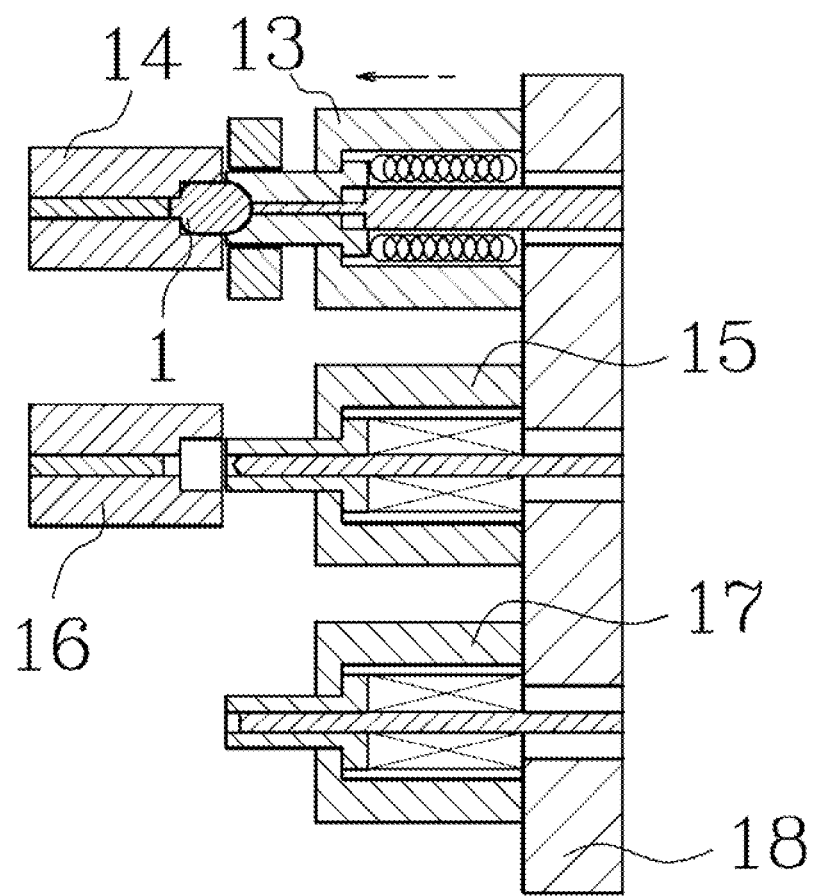
FIGS. 3A and 3B are views illustrating a first forming step and an operation according to the embodiment of the present invention.
Figure 3B:
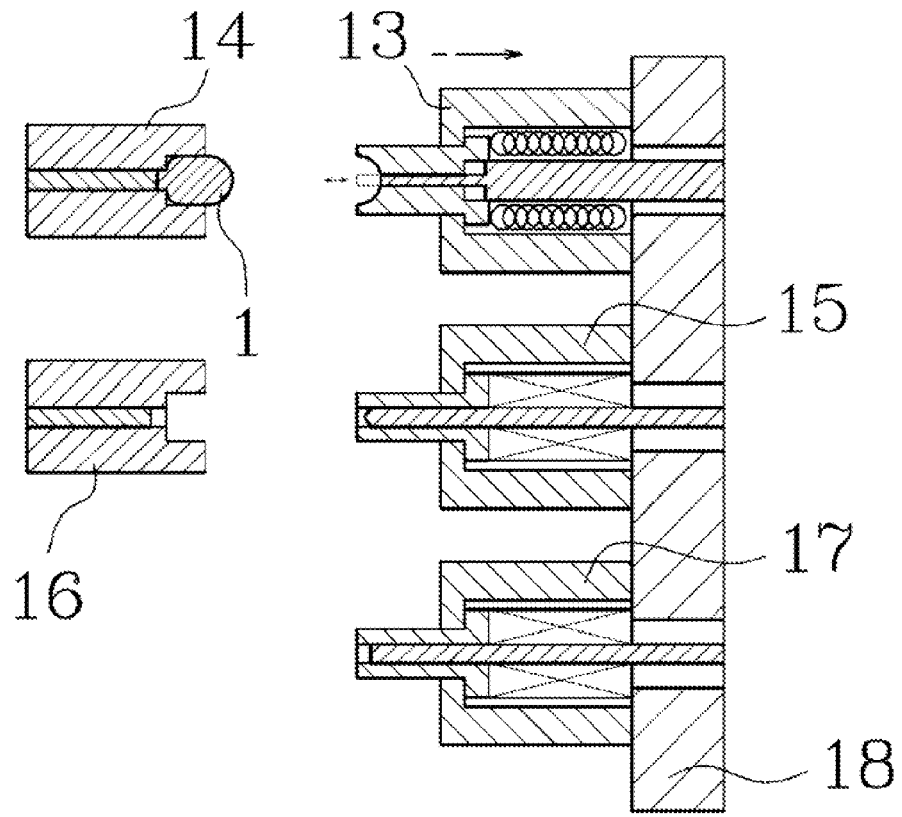

On the other hand, in the first forming step (S20), as shown in FIG. 3A, the first press die 13 presses the material 1 to the first fixed die 14 while the pressing is buffered by a tension force of a spring so that the material is formed in an incomplete state. Then, as shown in FIG. 3B, the first press die 13 is returned to an initial position in a state that the material 1 is inserted in the first fixed die 14. The first press die 13 may be smoothly separated from the first fixed die 14 after pressing the material, because of having a hemispheric shape.

Further, the first press die 13 is provided at a center thereof with a push rod for pushing the material to the first fixed die 14 so as to prevent the material 1 from departing from the first fixed die 14 before the first press die 13 returns to the initial position. Furthermore, the first fixed die 14 has a through hole formed at a center thereof, through which a push rod reciprocates. A part of the material 1 is pressed and introduced into the through hole so as to form a protrusion. The protrusion is inserted into the first fixed die 14 and the second fixed die 16, so as to prevent the material from being separated from the first and second fixed dies 14 and 16.

Figure 4A:
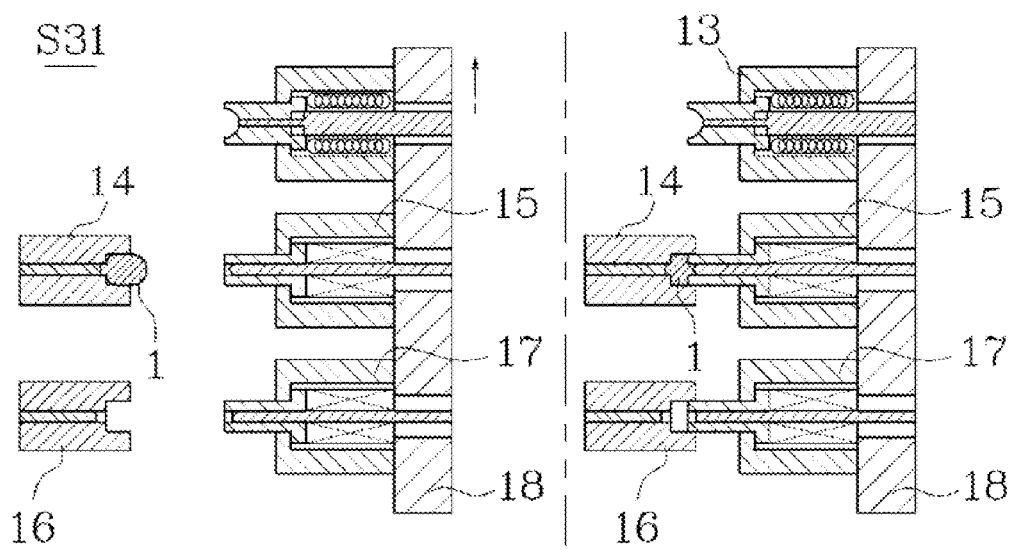
FIGS. 4A to 4C are views illustrating a second forming step and an operation according to the embodiment of the present invention.
Figure 4B:
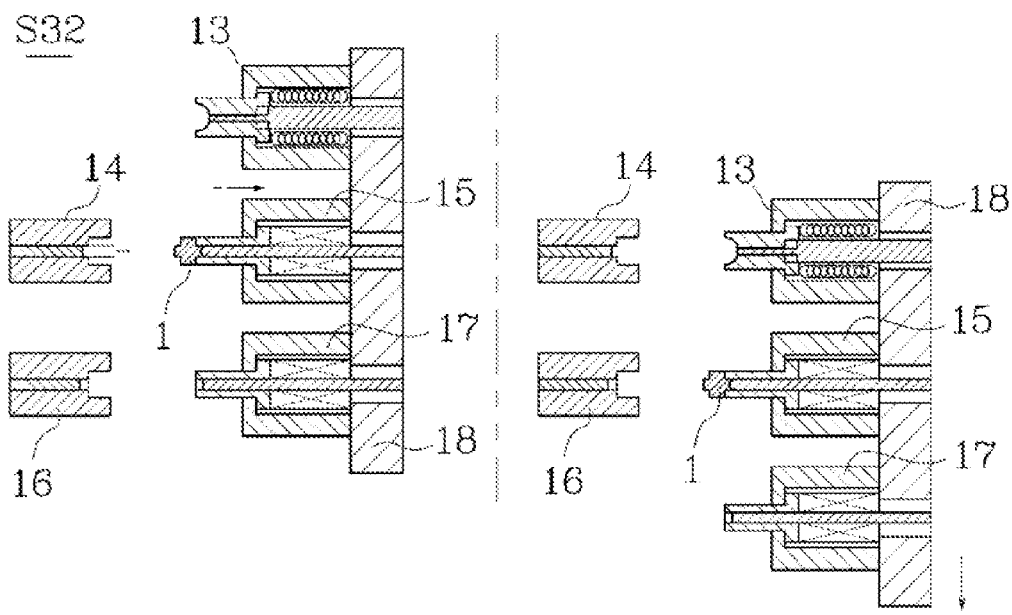
Figure 4C:
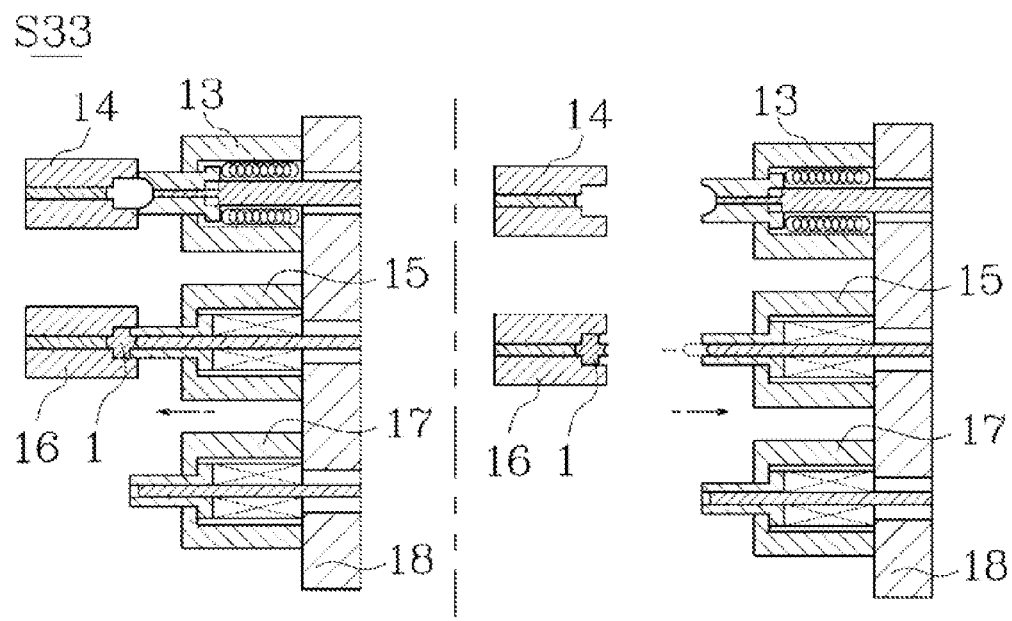

On the other hand, the second forming step (S30) includes sub-steps of (S31) forming the material 1 in a basic shape by pressing the material 1 after moving a block 18 for fixing the first, second and third press dies 13, 15 and 17 in a series so that the second press die 15 is opposite to the first fixed die 14, as shown in FIG. 4A, (S32) removing the basic shaped material 1 from the first fixed die 14 by means of the second press die 15 before moving the material to the second fixed die 16, as shown in FIG. 4B, and (S33) inserting the material 1 to the second fixed die 16 by means of the second press die 15 and returning the second press die 15 to the initial position, as shown in FIG. 4B. The second press die 15 also has a through hole formed along a center axis thereof, through which a push rod reciprocates. A part of the material 1 is pressed and introduced into the through hole so as to form a protrusion.

Figure 5A:
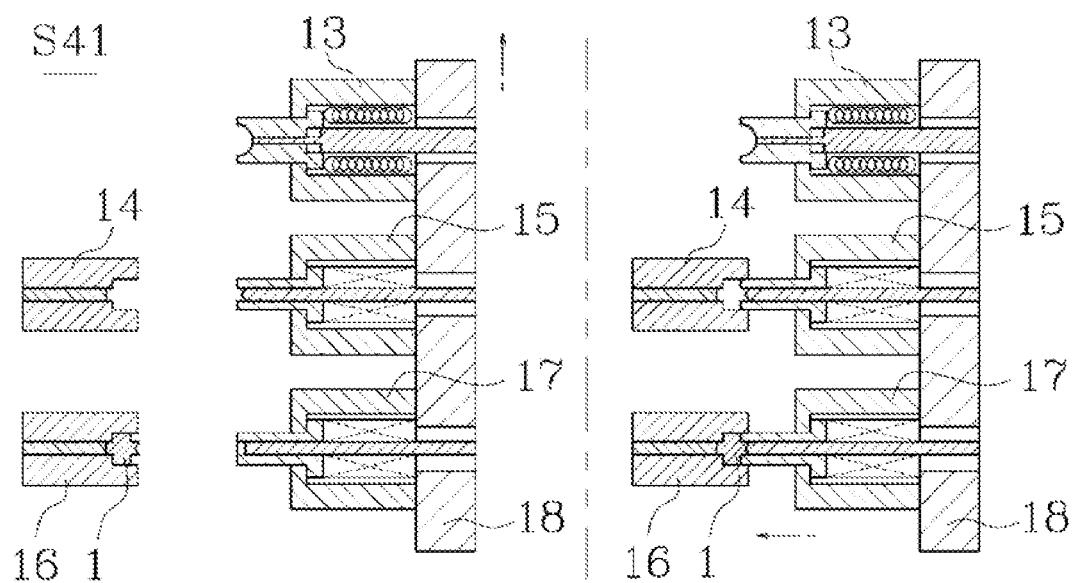
FIGS. 5A and 5B are views illustrating a third forming step and an operation according to the embodiment of the present invention.
Figure 5B:
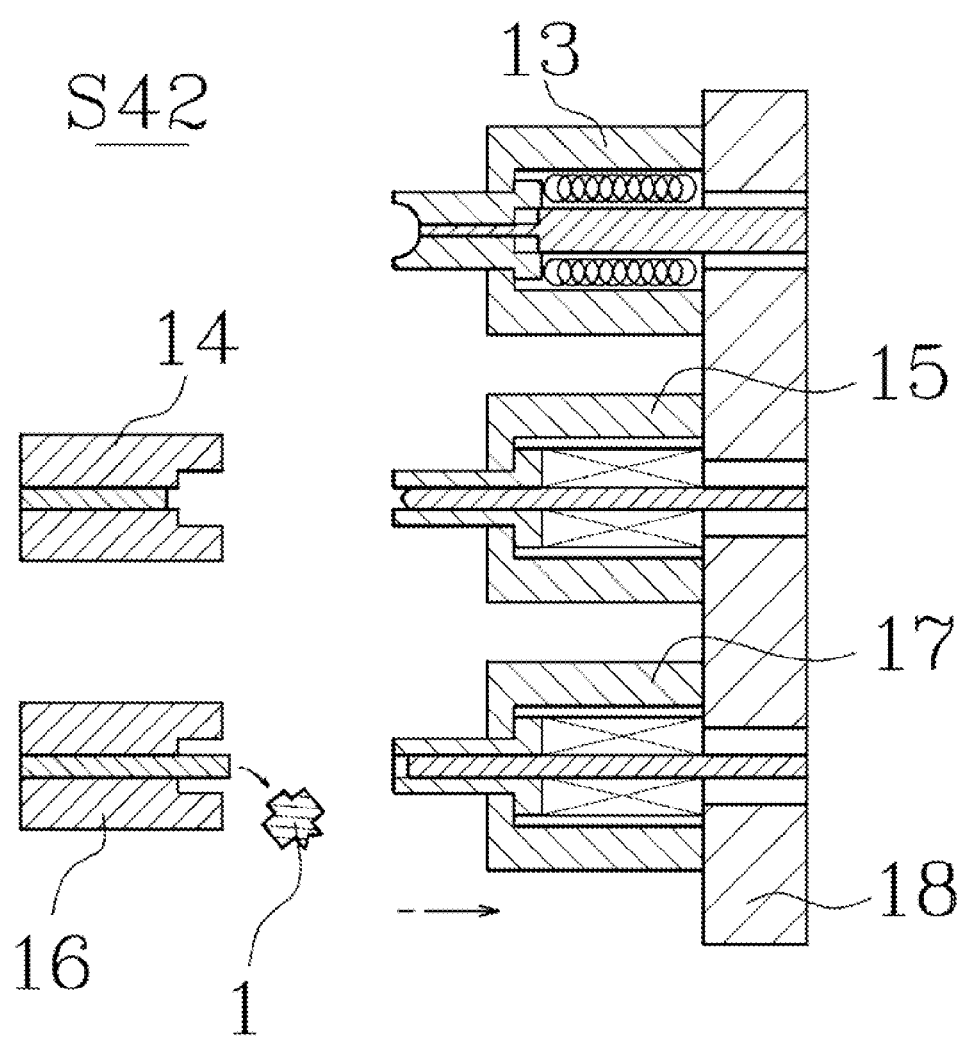

On the other hand, the third forming step (S40) according to the present invention includes the sub-steps of (S41) returning the third press die 17 to the initial position while holding the material 1 inserted in the second fixed die 16 after the material 1 is pressed by the third press die 17 to the second fixed die 16 so as to form the material 1 in a predetermined shape, as shown in FIG. 5A, and (S42) discharging the material 1 from the second fixed die 16, as shown in FIG. 5B. At this time, the material 1 is discharged from the second fixed die 16 by operating a separate push rod to push the inserted material 1 out of the second fixed die 16. Moreover, the second fixed die 2 16 and the third press die 17 respectively have a prominence and depression to form the material 1 with a protrusion and groove which respectively have a predetermined shape.

Figure 6A:
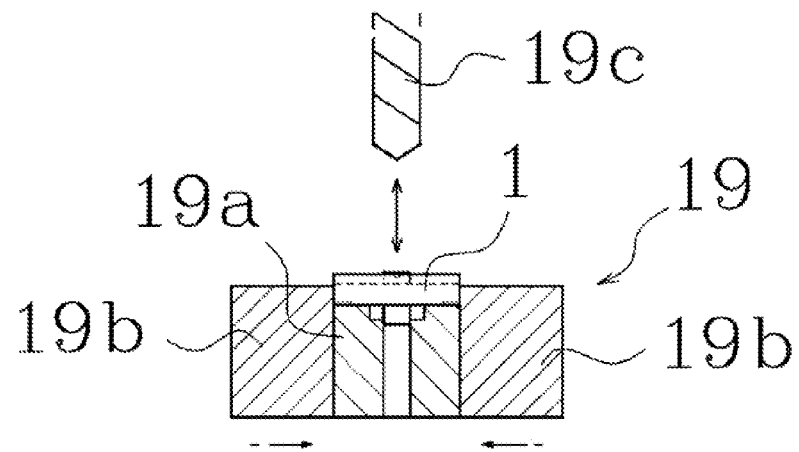
FIGS. 6A to 6C are views illustrating a fourth forming step and an operation according to the embodiment of the present invention.
Figure 6B:
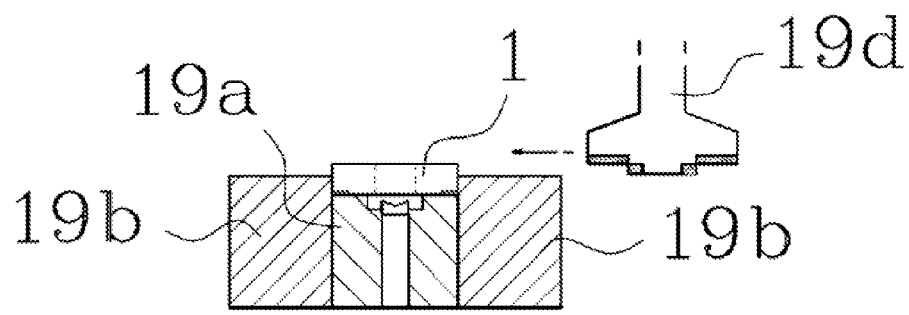
Figure 6C:
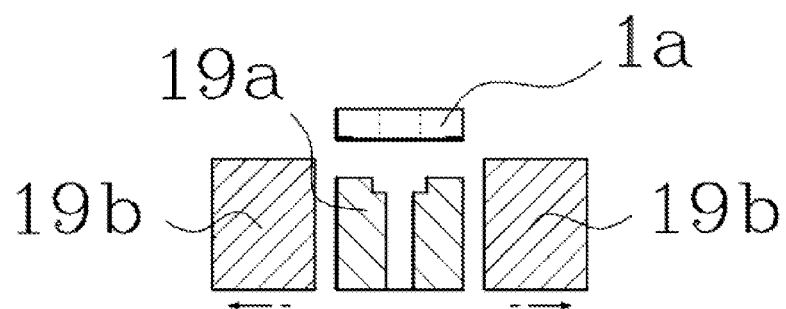

On the other hand, in the fourth forming step (S50), the discharged material 1 is formed with a hole by a drill in a state of being individually grasped, and is finally cut to have a predetermined thickness before the material is discharged, as shown in FIGS. 6A to 6C. The fourth forming step (S50) is accomplished by a finishing and forming device 19 which includes a base 19a which receives the material 1 and has a through hole in which the protrusion formed on the material 1 is inserted, a pair of clamps 19b to grasp an outer periphery of the material 1 which is received in the base 19a, a drill 19c for forming a hole at a center portion of the material 1, and a cutter (trimming device) 19d for cutting an upper surface of the material 1 so as for the material 1 to have a predetermined thickness.

Hereinafter, an operation of a preferred embodiment of the present invention will be described below.

Firstly, according to the present invention, in the material supplying step (S10), the material 1 with a wire shape is supplied through a pair of rollers. The material 1 supplied as described above and having the wire shape is supplied through the supporting die 11a and the transferring die 11b. When a leading end of the material 1 comes in contact with a stopper 11c spaced at a predetermined distance from the transferring die 11b so that the supplying of the material is stopped, the transferring die 11b moves upwardly and cuts the material 1 at a boundary between the supporting die 11a and the transferring die 11b. Then, the material 1 is moved between, the first press die 13 and the first fixed die 14 which constitute the first forming device 12.

As described above, in the first forming step (S20), when the material 1 is cut and supplied toy a predetermined length, the first press die 13 makes the material 1 have a shape while pressing the material 1 to the first fixed die 14. At this time, the pressing is buffered by tension force of the spring provided to the first press die 13, so that the material 1 is made to have an incomplete shape.

Then, the first press die 13 returns to the initial position while the material 1 is inserted in the first fixed die 14. The first press die 13 can be smoothly separated from the first fixed die 14 after pressing the material 1 because of having a hemispheric shape. On the other hand, the material 1 is held in a state of being inserted in the first fixed die 14 by means of the push rod which protrudes through the center of the first press die 13.

Then, in the second forming step (S30), the block 18 which fixes the first, second and third press dies 13, 15 and 17 in a row moves in order for the second press die 15 to move opposite to the first fixed die 14. Accordingly, the second press die 15 presses the material 1 so that the material 1 has a basic shape, and in turn removes the basic shaped material 1 from the first fixed die 16 so as to move the basic shaped material 1 to the second fixed die 16. Continuously, the second press die 15 inserts the material 1 into the second fixed die 16, and returns to the initial position. When, the second press die 15 departs from the first fixed die 14, the push rod extending through the center of the first fixed die 14 pushes the material 1 to the second press die 15 so as to insert the material 1 into the second press die 15. On the other hand, when the material 1 is inserted into the second fixed die 15 by the second press die 15, the push rod extending through the center of the second press die 15 pushes the material 1 so that the material 1 is inserted into the second fixed die 16.

Then, in the third forming step (S40), when the third press die 17 presses the material 1 to the second fixed die 16 so as to make the material 1 have a complete shape, and returns to an initial position in a state that the material 1 is inserted into the second fixed die 16, the material 1 is removed from the second fixed die 16. The discharge of the material 1 is achieved in such a manner that a separate push rod pushes and discharges the material out of the second fixed die 16. A separate supplying device collects the materials 1 discharged as described above, and supplies the materials 1 to a finishing device 19 which performs the fourth forming step S50, one by one.

Then, in the fourth forming step S50, when the material 1 which is individually supplied is received in the base 19a, the clamps 19b grasp the outer periphery of the material 1 and the drill 13c descends downwardly while rotating, so as to form a through hole at the center portion of the material 1. Next, the cutter 19d operates to cut the upper surface of the material 1 so that the material 1 has a predetermined thickness.

Figure 7:
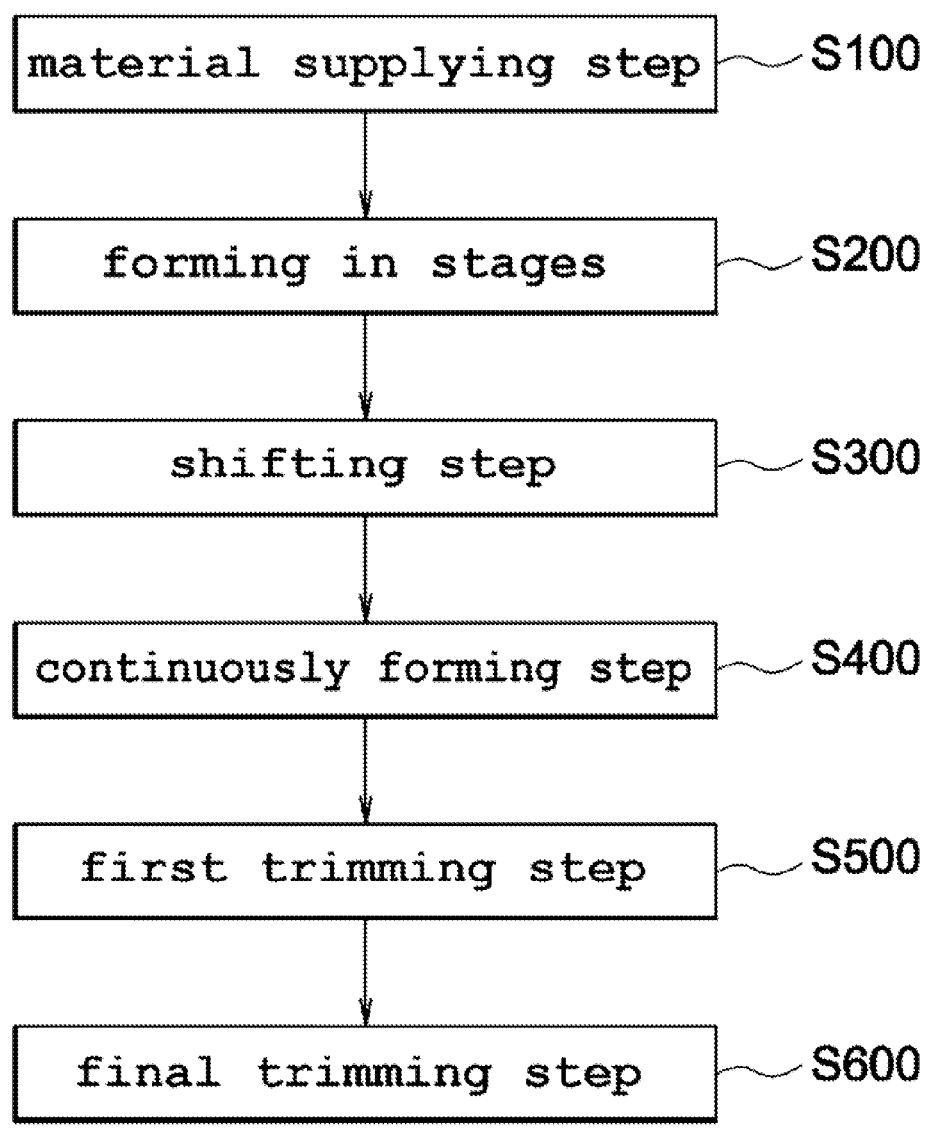
FIG. 7 is a block diagram illustrating a method of manufacturing a battery terminal plate in steps according to the other embodiment of the present invention.

Hereinafter, a method of manufacturing a battery terminal plate according to another embodiment of the present invention will be described. As shown in FIG. 7, the method of manufacturing the battery terminal plate by pressing a material with a volume several times so as to make the material have a previously designed shape is shown. The method includes the steps of (S100) supplying a material to an initial processing position between a fixed die 120 and a press die 130 which provide a forming position in steps, in which the material 1 which is continuously supplied is picked up by a shifting and supplying device 170, (S200) pressing and forging the material 1 while the material 1 placed at the initial position is inserted into the fixed die 120 by the press die 130, (S300) shifting the material 1 from a fixed die 120 positioned at the initial processing position to a next fixed die 120 and returning to the initial position, while the shifting and supplying device 170 supplies a next material 1 to the initial processing position, (S400) continuously making the material 1 have a shape by continuously performing the pressing and forging step S200 and the shift step S300 from a first process step to an $n^{th}$ process step, (S500) trimming a part of the material 1 by a first trimming device 150 so that the material 1 does not satisfy a standard of a design, when the shifting and supplying device 170 shifts the formed material 1 to the first trimming device 150 provided next to the fixed die 120, and (S600) finally trimming the formed material 1 by a second trimming device 160 so that the material 1 satisfies a standard of the design, when the shifting and supplying device 170 shifts the material 1, which is trimmed in a first trimming step, to the second trimming device 160 provided in a next stage.

Figure 8:
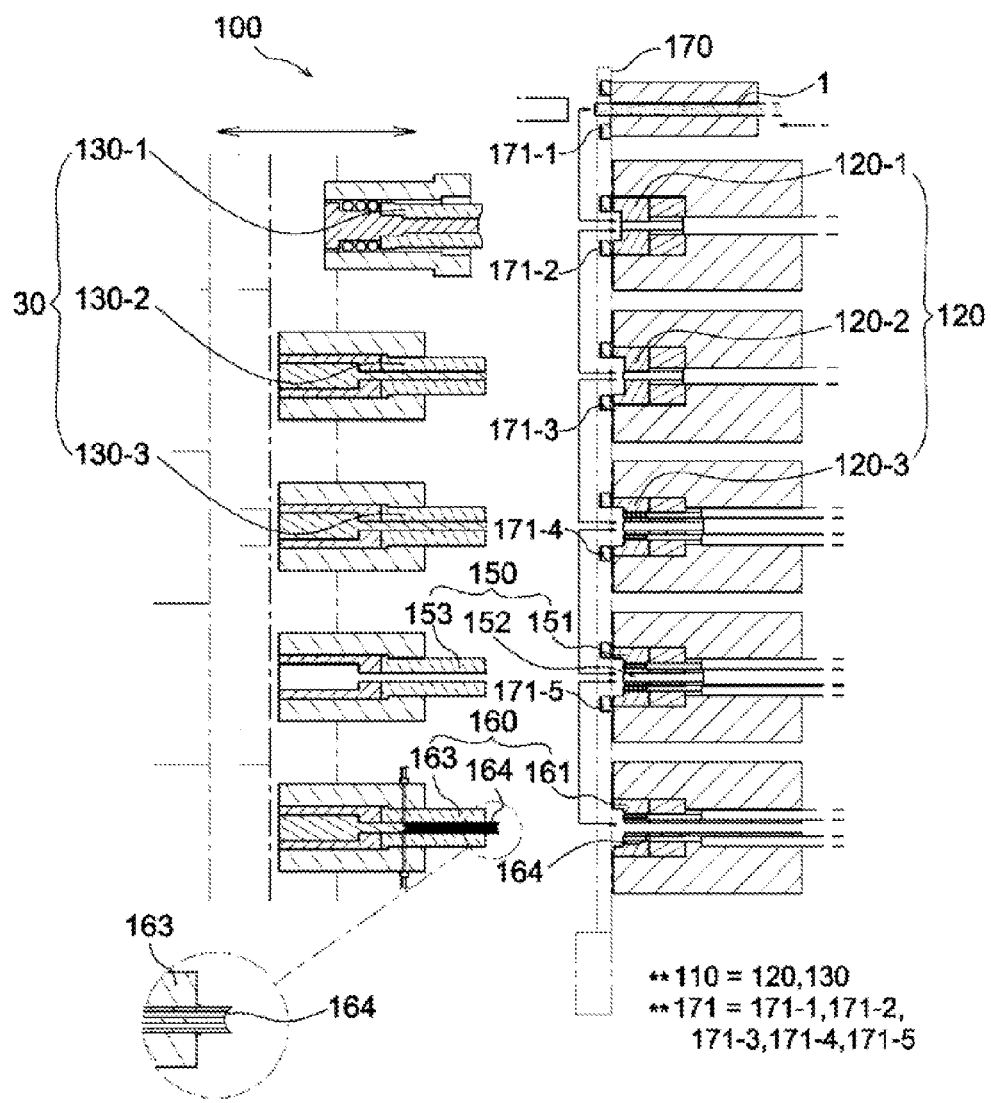
FIG. 8 is a view illustrating a structure of an apparatus according to the other embodiment of the present invention.

Hereinafter, an apparatus for manufacturing a battery terminal plate according to another embodiment of the present invention will be described. As shown in FIG. 8, the apparatus 100 presses a material 1 with a volume several times to form a battery terminal plate with a previously designed shape. The apparatus 100 includes a forming device 110 for pressing and forging the material 1 by means of a moving die which is correspondingly associated with each fixed die sequentially provided in steps, a trimming device 140 for firstly cutting burrs of the material, which is made to have a shape by a punching operation of the moving die in association with the fixed dies, in a state of not satisfying a standard of a design, and secondly cutting the material in a state of satisfying a standard of the design, and which is provided next to the forming device 110, and a shifting and supplying device 170 for picking and shifting the processed material 1 to a next step, and returning to an initial position, which is provided to a processing position next to the cutting process position of the trimming device 140 and a forming process position of the forming device 110.

Here, the material 1 according to the present invention is a unit block constituted of a volume, and includes a circular block, a polygonal block, including a square block, a pin shaped block, or a rod shaped block.

On the other hand, according to the present invention, the forming device 110 includes fixed dies 120 for providing a forming position in each step to the material 1, which are arranged in a row at a predetermined distance from one another, and a press die 130 for pressing the introduced material 1 to the fixed dies 120 to make the material 1 have a shape, which is arranged at a distance from the fixed dies 120 to correspond to each fixed die 120.

The forming in steps may be performed in order to prevent an overload of the forming device and to form a complete shape in a process of forming the material in a completed product.

As described above, the fixed dies 120 may include fixed dies 120-1, 120-2 and 120-3 which are arranged up and down, or left and right in a row at a predetermined distance, and provide a step by step forming position.

The fixed die 120 has a push rod which extends through a hole formed along a center axis thereof and which is operated by a separate driving device (providing a reciprocate movement such as a piston operation in a cylinder), and push and discharge the material 1, which is inserted and made to have a shape, out of the fixed dies 120.

Further, the press die portion 130 includes press dies 130-1, 130-2 and 130-3 which are arranged up and down, or left and right in a row at a predetermined distance on one fixed block 120, and which provide a pressing force (punching force) to the fixed die portion 120.

Here, the press die portion 130 may be a tension-press apparatus in which a pressing body (a die positioned at a leading end to make the material have a shape) placed at a leading end of an external housing is elastically repelled by a spring. As described above, the press driving device of the press die portion 130 may be a piston moving in a cylinder, but the press driving device may include any driving device which performs a reciprocating movement.

On the other hand, the trimming device 140 may include a fixed die portion 120 constituting a forming device 110, a first trimming portion 150 which is provided next to the press die portion 130 and cuts burrs of the material 1 by punching the material 1 in a state of not satisfying a standard of a design, and a second trimming portion 160 which is provided next to the first trimming portion 150 and finally cuts the material in a state of satisfying a standard of the design.

The first trimming portion 150 includes a first fixed trimmer 151 which is arranged next to the fixed die portion 120 and provides a die receiving the material 1 which is shifted by the shifting and supplying device 170, and which is provided with a first trimming means 152 cutting a part of the material 1 by punching the material 1 in a state of not satisfying a standard of a design, and a first moving trimmer 153 which is arranged next to the press die portion 130 and moves along with the press die portion 130, so as to press and fix the shifted material 1 to the first fixed trimmer 151.

In the above description, the first trimming means 152 of the first fixed trimmer 151 is a trimming device which is extended through the first fixed trimmer 151 by a piston moving in a cylinder or a driving device which reciprocally moves, so as to cut the material 1, in which a cutting tool prepared on a leading end of the trimming device has a pin shape with a plane section.

Further, the first moving trimmer 153 has a path through which scraps cut by the first trimming means 152 are sequentially pushed and discharged.

Furthermore, the second trimming portion 160 includes a second fixed trimmer 161 which is arranged next to the first trimming portion 150 and provides a die which receives a material 1 shifted by the shifting and supplying device 170, and which includes a discharging means 162 for pushing and discharging the material 1 when the cutting is completed, and a second moving trimmer 163 which is arranged next to the first moving trimmer 153, and moves along with the first moving trimmer 153, and which is provided with a second trimming means 164 which punches and cuts a part of the material 1 to meet a standard of a design.

Further, the second fixed trimmer 161 has a path through which scraps cut by the second trimming means 164 are discharged.

Furthermore, the discharging means 162 of the second fixed trimmer 161 may be a push rod which is extended, through the second fixed trimmer 161 by a piston moving in a cylinder or a driving device which reciprocally moves, so as to push the material 1.

Moreover, the second trimming means 164 of the second moving trimmer 163 is extended through the first fixed trimmer 151 by a piston moving in a cylinder or a driving device which reciprocally moves so as to cut the material 1, and may be a pipe shaped cutter having a knife section at an end thereof.

In addition, the second trimming means 164 of the second moving trimmer 163 may have the other end thereof which is connected to an air sprayer for removing scraps generated in a final cutting process.

On the other hand, according to the present invention, the shifting and supplying device 170 may be a shifting device which is provided in a row among the fixed die portion 120, the press die portion 130, and the first and second trimming portions 150 and 160, and which repeatedly performs an operation of returning to an initial position after placing the material 1 at a processing position and shifting the material to a next processing position.

On the other hand, the shifting and supplying device 170 includes grips 171 which are prepared on a supplying position to which the material 1 is continuously provided, a forming position of the fixed die portion 120, and a processing position of the first and second trimming portions 150 and 160, respectively, so as to grip the material 1, shifting means 172 which are connected to and associated with the grips 171 so as to shift each grip 171 to a next step and return to an initial position, and grip driving means 173 which push or pull grips respectively, so that each grip grasps or releases the material.

In the above description, each grip 171 may be a nipper pivotally hinged to the grip driving means so as to grasp or release the material 1, or a gripping tool constituted of a pair of blocks which are spaced and which have both sides thereof moving toward each other or being spaced from each other.

Further, the shifting means 172 is a frame on which each grip 171 is mounted, and is reciprocally moved by the piston moving in the cylinder or the driving device which reciprocally moves, for a predetermined period.

Further, the grip driving means 173 includes an operation handle which enables each grip 171 to grasp or release the material 1 in a state that each grip 171 is fixed to the shifting means 172, and a driving body constituted of a pinion rotated by an electric motor and a rack gear engaged with the pinion to linearly move. The rack gear is connected to the operation handle and moves linearly.

Hereinafter, an operation of the preferred embodiment of the present invention will be described below.

Here, the material 1 which is continuously supplied is a unit block constituted of a volume, and includes a circular block, a polygonal block including a square block, a pin shaped block, or a rod shaped block. The material 1 may be supplied in a form of a unit block made by cutting a wire material, or in a form of a unit block which is previously cut and is subjected to a pretreatment process (which is treated in advance to have a predetermined shape).

The first grip 171-1 of the shifting and supplying device 170 picks up the material 1, and shifts the material 1 to an initial processing position between the fixed die portion 120 providing a forming position in each step, and the press die portion 130, in step S100.

Figure 9:
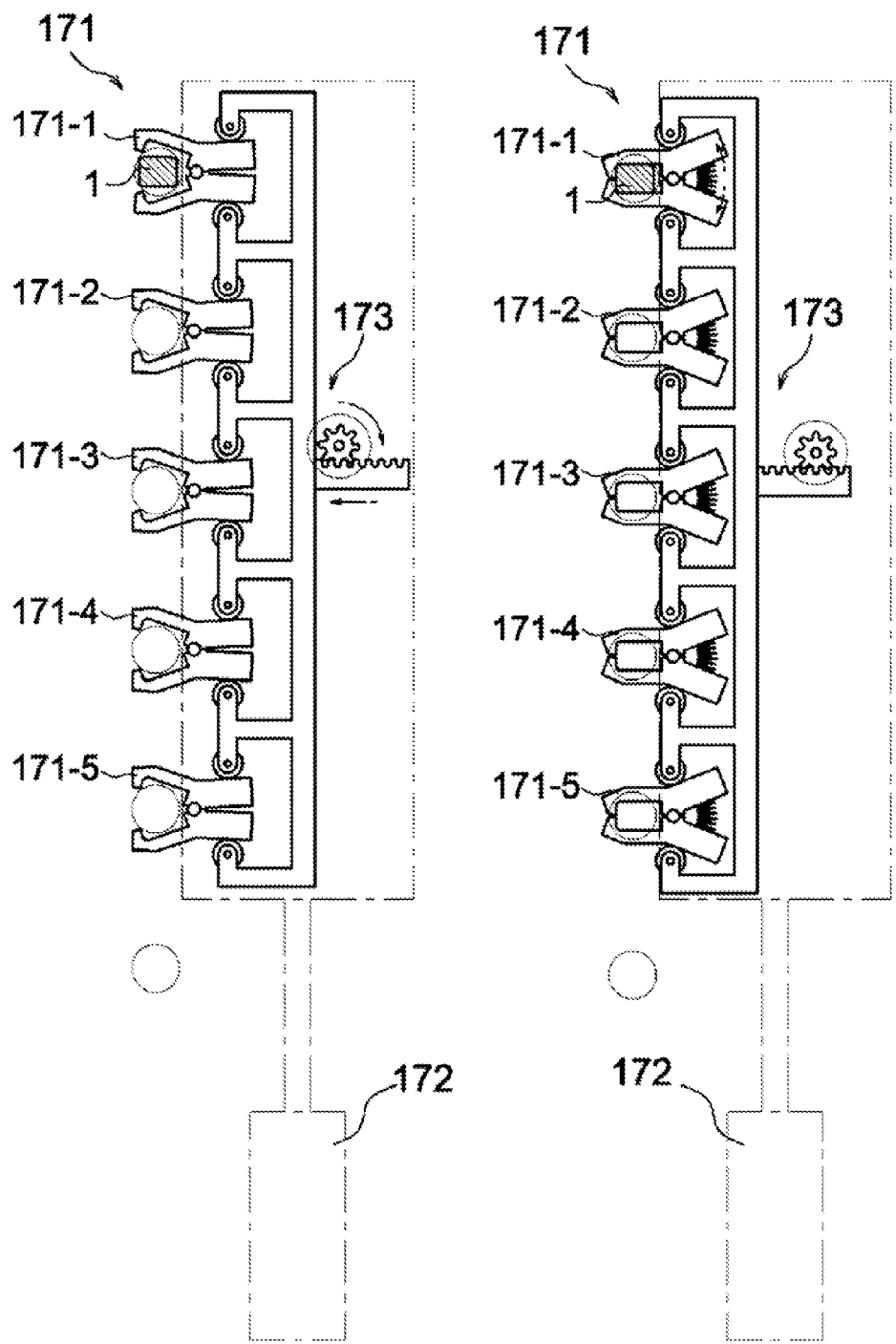
FIG. 9 is a front view illustrating a grasp operation state (an initial state that a material to be process is introduced) of a shifting and supplying portion according to the present invention.

As shown in FIG. 9, the first grip 171-1 constituting the shifting and supplying device 170 grasps the material 1 which is continuously supplied through a separate supplying device, in other words, in a state that the grip driving means 173 pushes the other end of the first grip 171-1, when the grip driving means 173 is moved toward one end of the first grip 171-1, the first grip 171-1 is operated by an elasticity of a spring provided to the other end of the first grip 171-1 so as to grasp the material 1.

Figure 10:
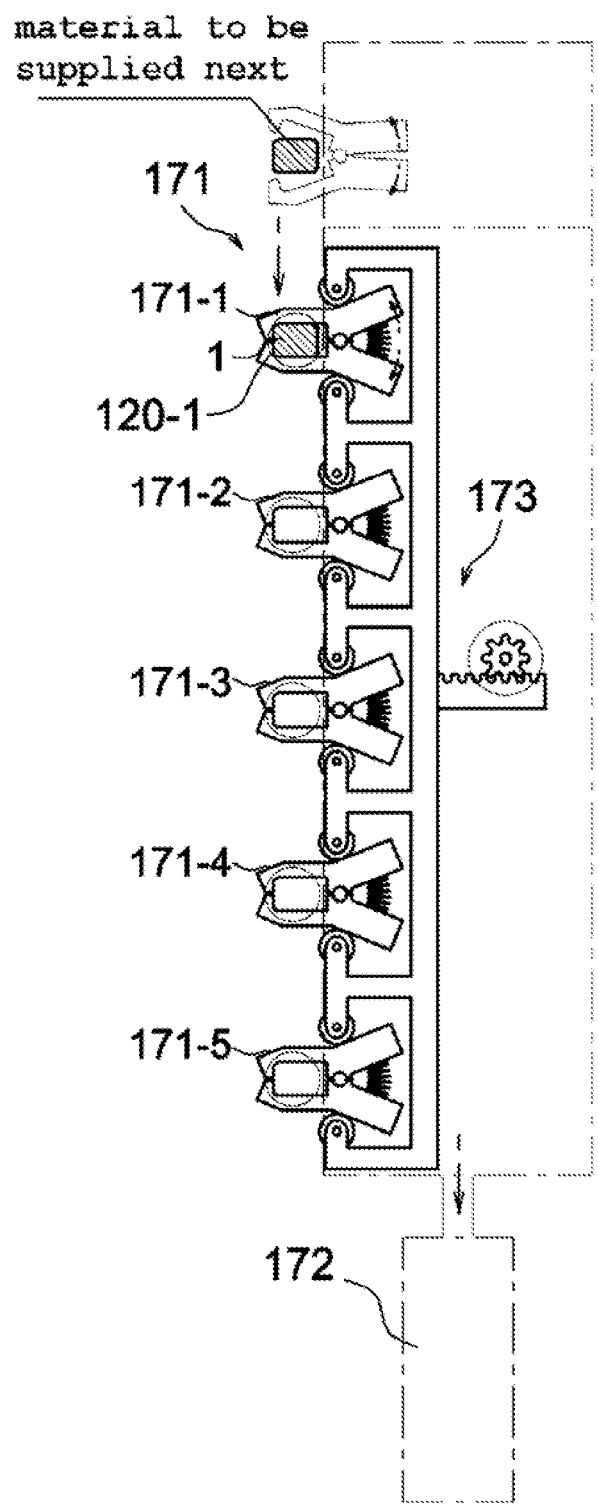
FIG. 10 is a longitude sectional view illustrating the shifting operation state (shifting the material to a first forming position) of the shifting and supplying portion according to the present invention.
Figure 11:
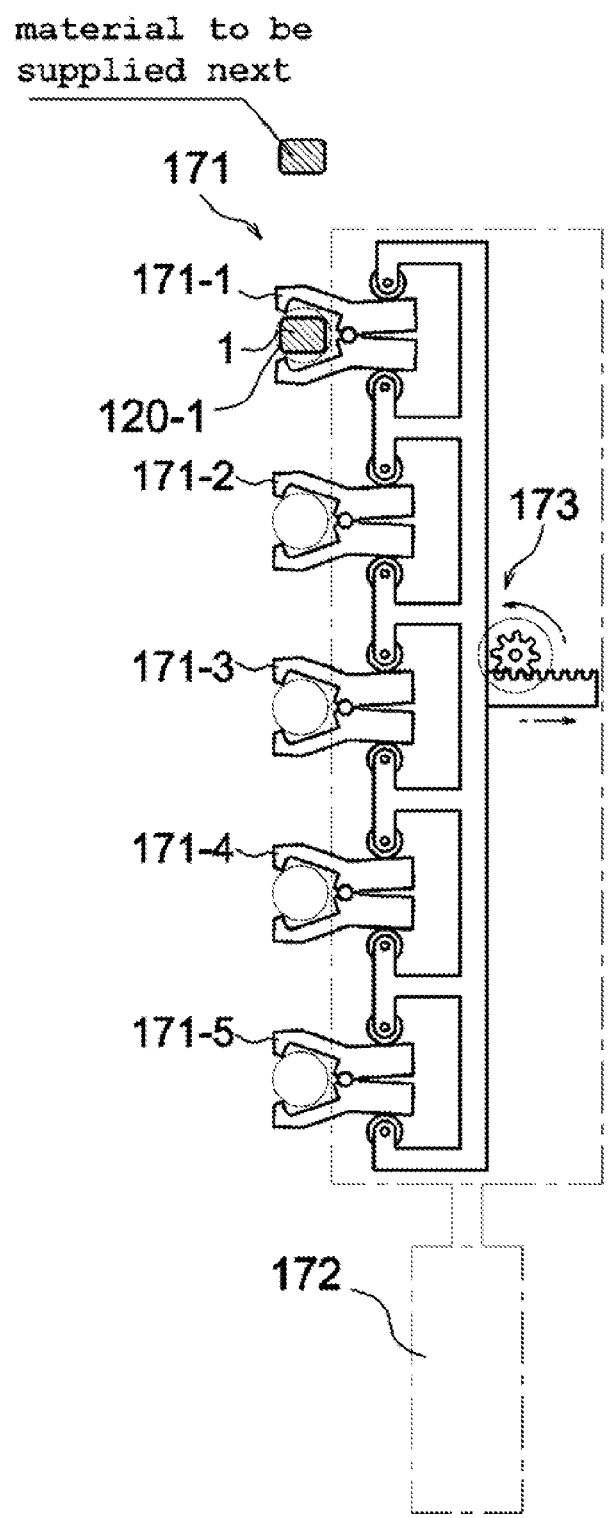
FIG. 11 is a front view illustrating a grasp releasing state of the shifting and supplying portion according to the present invention.

As shown in FIG. 10, the shifting means 172, i.e. a piston of a cylinder, pulls the shifting and supplying device 170 so that the first grip 171-1 is placed opposite to the first fixed die 120-1 in a first step. In this state, as shown in FIG. 11, when the pinion of the grip driving means 173 which is rotated by an electric motor moves the rack gear, an operation link (which is prepared to operate each grip) connected to the rack gear pushes the other end of the first grip 171-1, so that the first grip 171-1 becomes open due to the pressure of the operation link. As a result, the material 1 is placed in the first fixed die 120-1.

Figure 12:
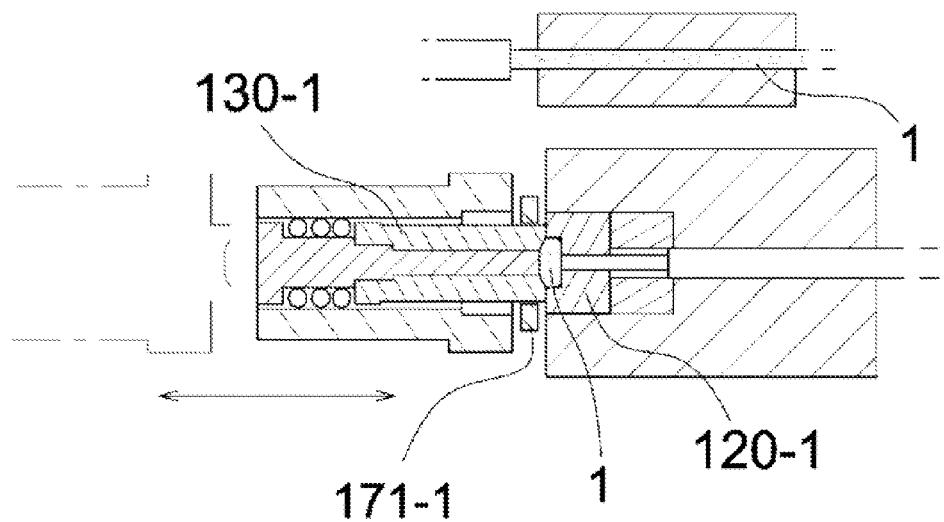
FIG. 12 is a longitudinal sectional view illustrating an operation state of a forming apparatus (a first forging) according to the present invention.

As shown in FIG. 12, then, as the first press die 130-1 constituting the press die portion 130 punches and presses the material 1 and returns, forming is completed in the first fixed die 120-1.

Figure 13:
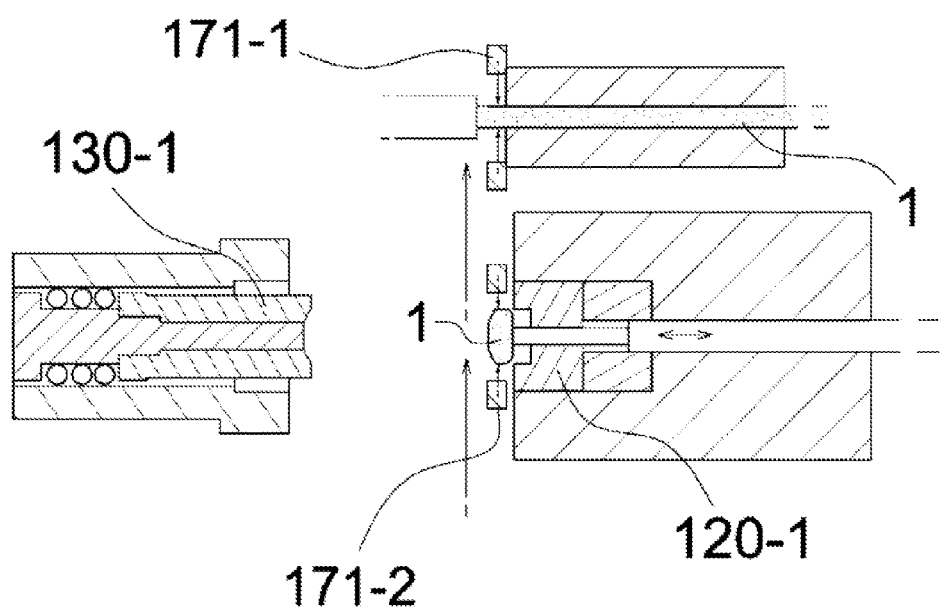
FIG. 13 is a front view illustrating a state that the shifting and supplying portion returns to an initial position to grasp a material to be introduced next and a material formed in a first step according to the present invention.

As described above, when the forming is achieved in the first step, the push rod of the first fixed die 120-1 pushes and removes the material 1 as shown in FIG. 13. At this time, the shifting and supplying device 170 returns to an initial position, i.e. the first grip 171-1 moves to the supply portion which continuously supplies the material 1 and performs the above mentioned grasping operation. At the same time, the second grip 171-2 grasps the material 1 removed from the first fixed die 120-1.

Figure 14:
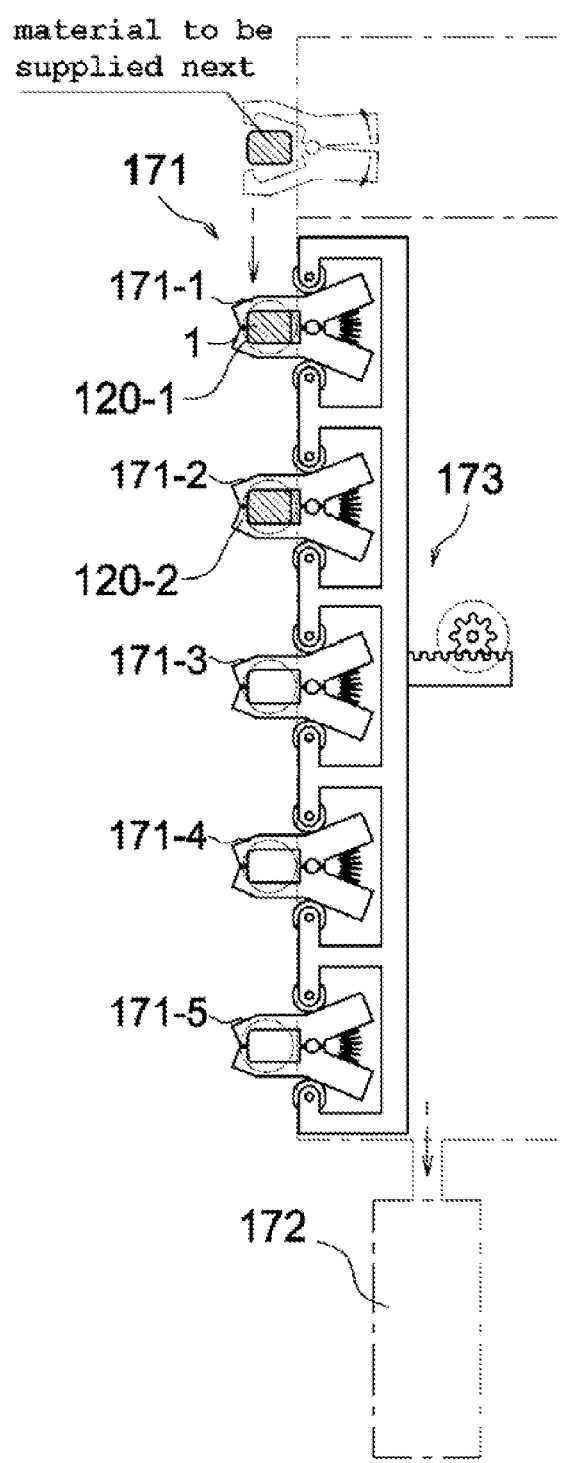
FIG. 14 is a longitudinally sectional view illustrating the shifting operation state (shifting the materials to first and second forming positions) of the shifting and supplying portion according to the present invention.

In the state, as shown in FIG. 14, the shifting means 172 of the shifting and supplying device 170 operates and shifts the materials 1 to a next forming step. In other words, the first grip 171-1 shifts the material 1 to the first fixed die 120-1 which is located at a first forming position, and the second grip 2 171-2 moves the material 1 to the second fixed die 120-2 which is placed at a second forming position.

Figure 15:
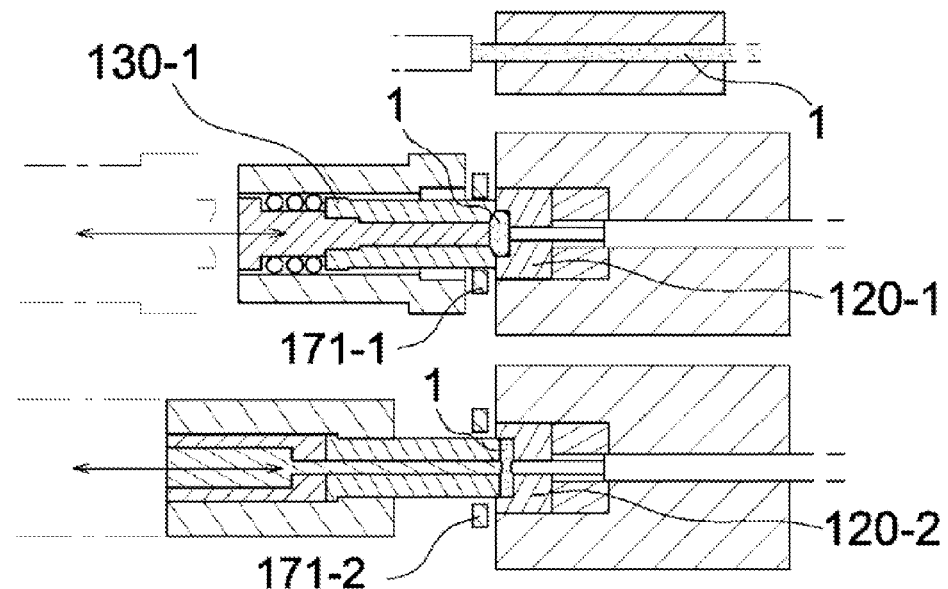
FIG. 15 is a longitudinally sectional view illustrating an operation state of a forming apparatus (first and second forging) according to the present invention.

As shown in FIG. 15, then, as the first and second press dies 130-1 and 130-2 constituting the press die portion 130 punch and press the material 1 and return, forming is completed in the first and second fixed dies 120-1 and 120-1.

Figure 16:
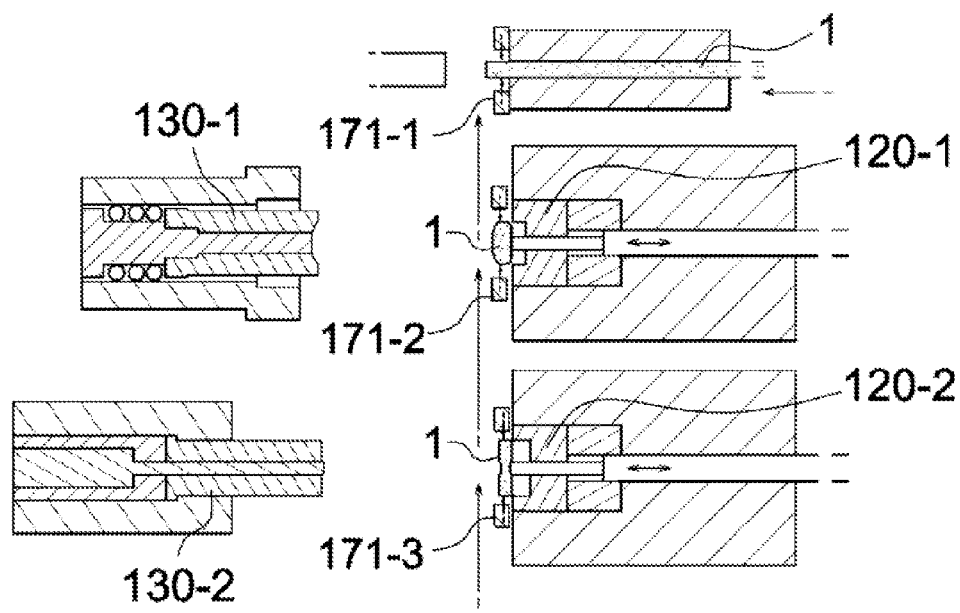
FIG. 16 is a front view illustrating a state that the shifting and supplying portion returns to an initial position to grasp a material to be introduced next and a material formed in first and second steps according to the present invention.

As described above, when the forming is achieved in the first and second steps, the push rods of the first and second fixed dies 120-1 and 120-2 push and remove the materials 1 respectively as shown in FIG. 16. At this time, the shifting and supplying device 170 returns to an initial position, i.e. the first grip 171-1 moves to the supply portion which continuously supplies the material 1 and performs the above mentioned grasping operation, and the second grip 172-2 grips the material 1 which is removed from the first fixed die 120-1. At the same time, the third grip 171-3 grasps the material 1 removed from the second fixed die 120-2.

Figure 17:
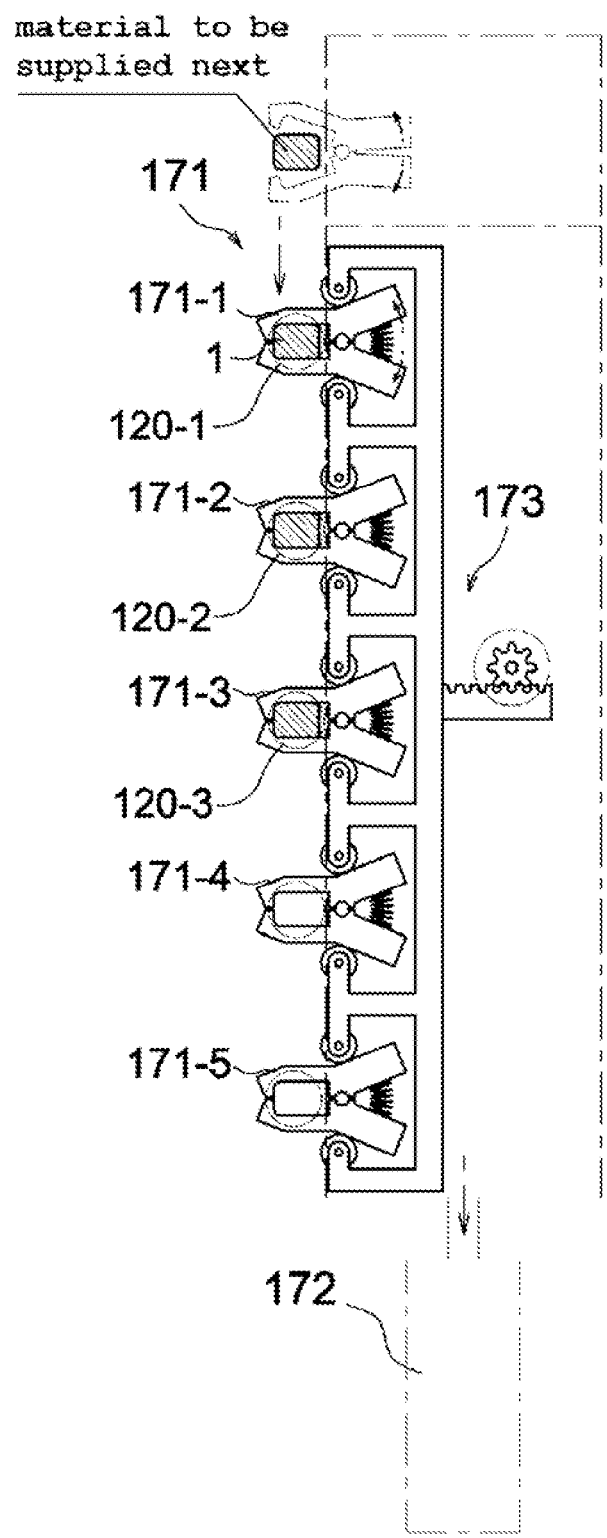
FIG. 17 is a longitudinally sectional view-illustrating the shifting operation state (shifting the material to first, second and third forming positions) of the shifting and supplying portion according to the present invention.
Figure 18:
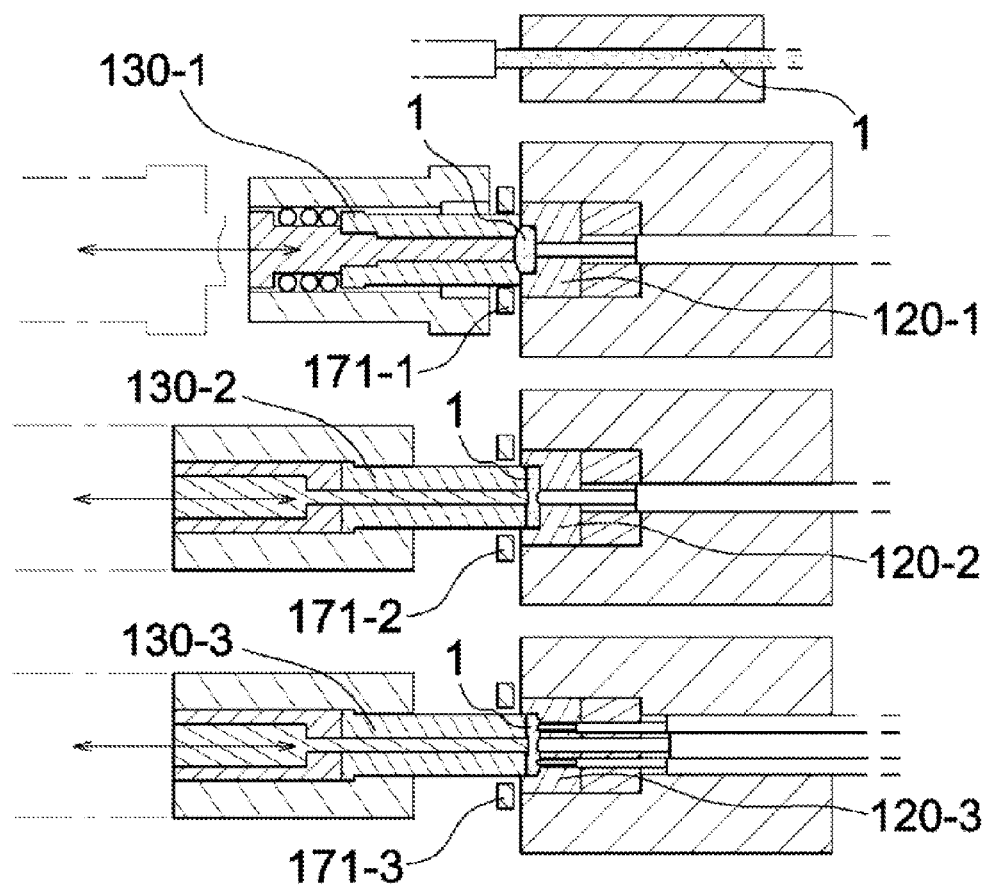
FIG. 18 is a longitudinally sectional view illustrating an operation state of a forming apparatus (first, second and third forging) according to the present invention.

In the state, as shown in FIG. 17, the shifting means 172 of the shifting and supplying device 170 operates and shifts the materials 1 to a next forming step. In other words, the first grip 171-1 shifts the material 1 to the first fixed die 120-1 which is located at a first forming position, the second grip 2 171-2 moves the material 1 to the second fixed die 120-2 which is placed at a second forming position, and the third grip 171-3 moves the material 1 to the third fixed die 120-3 which is placed at a third forming position.

As shown in FIG. 1S, then, as the first, second and third press dies 130-1, 130-2 and 130-3 constituting the press die portion 130 punch and press the material 1 and return, the forming is completed in the first, second and third fixed dies 120-1, 120-2 and 120-3.

Figure 19:
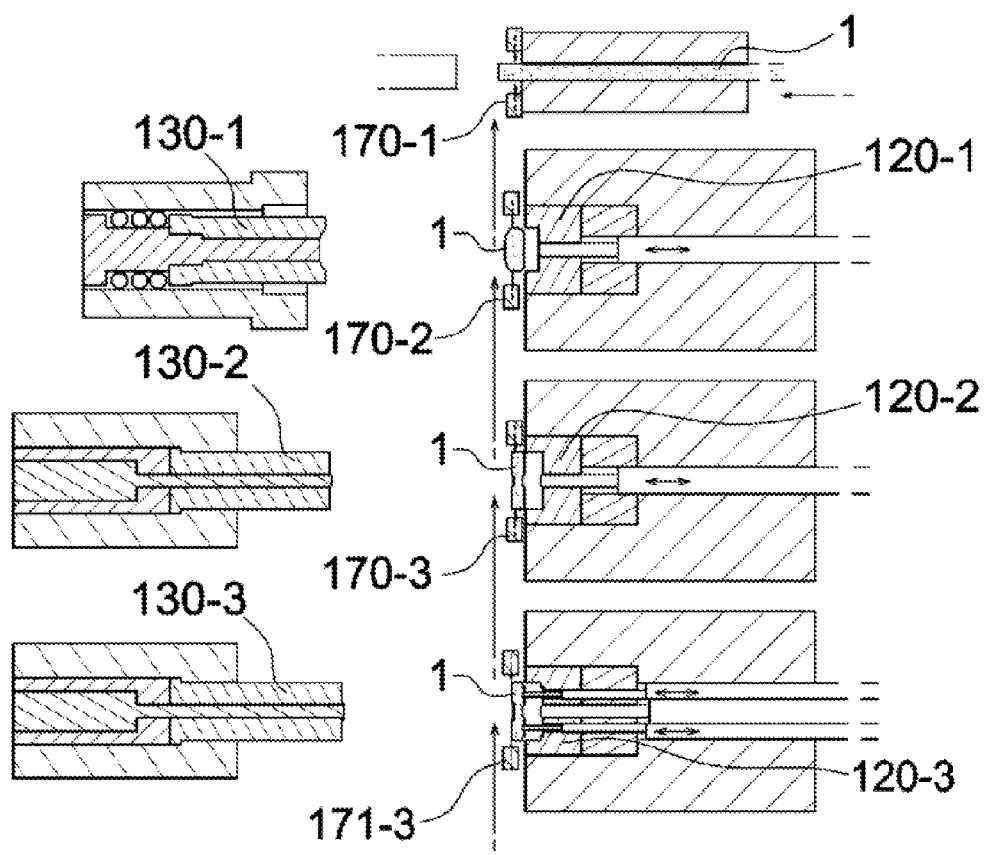
FIG. 19 is a front view illustrating a state that the shifting and supplying portion returns to an initial position to grasp a material to be introduced next and a material formed in first, second and third steps according to the present invention.

As described above, when the forming is achieved in the first, second and third steps, the push rods of the first, second and third fixed dies 120-1, 120-2 and 120-3 push and remove the materials 1 respectively, as shown in FIG. 19. At this time, the shifting and supplying device 170 returns to an initial position, i.e. the first grip 171-1 moves to the supply portion which continuously supplies the material 1 and performs the above mentioned grasping operation, the second grip 171-2 grips the material 1 which is removed from the first fixed die 120-1, and the third grip 171-3 grasps the material 1 which is removed from the second fixed die 120-2. At the same time, the fourth grip 171-4 grasps the material 1 removed from the third fixed die 120-3.

Figure 20:
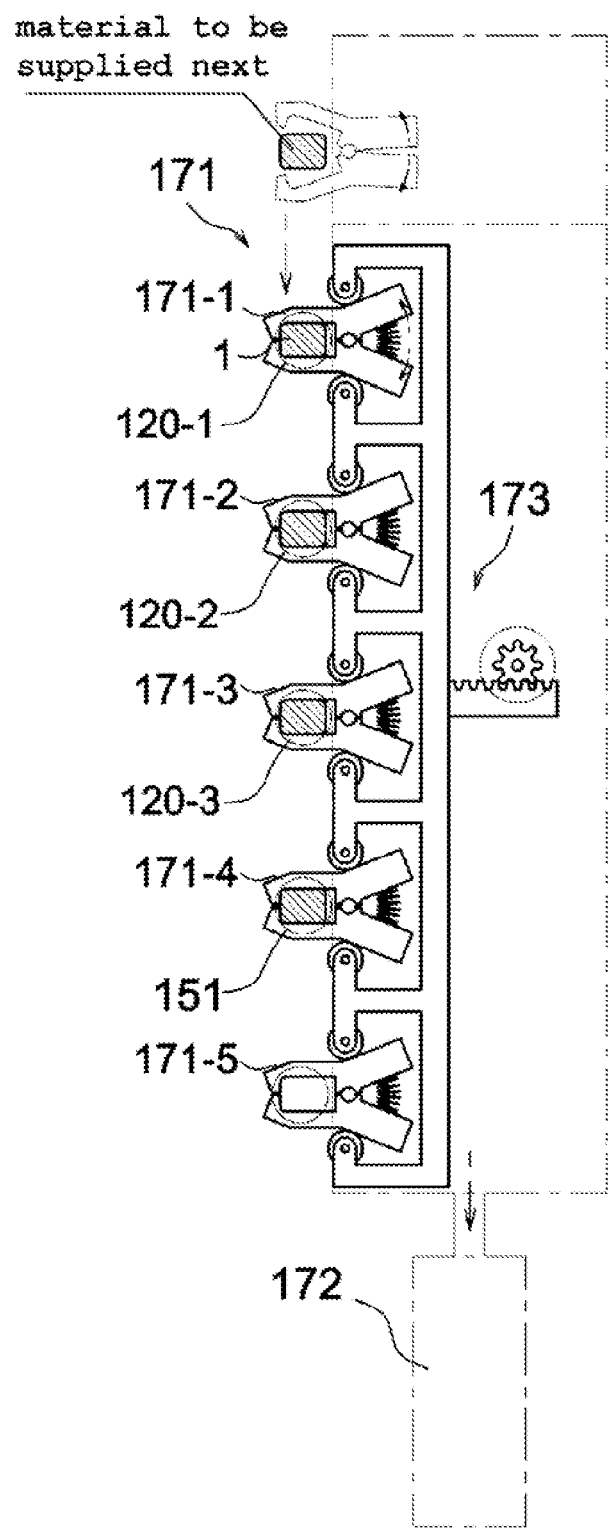
FIG. 20 is a longitudinally sectional view illustrating the shifting operation state (shifting the material to first, second and third forming positions and a first trimming position) of the shifting and supplying portion according to the present invention.

In the state, as shown in FIG. 20, the shifting means 172 of the shifting and supplying device 170 operates and shifts the materials 1 to a next forming step. In other words, the first grip 171-1 shifts the material 1 to the first fixed die 120-*i* which is located at a first forming position, the second grip 2 171-2 moves the material 1 to the second fixed die 120-2 which is placed at a second forming position, the third grip 171-3 moves the material 1 to the third fixed die 120-3 which is placed at a third forming position, and the fourth grip 171-4 moves the material 1 to the first fixed trimmer 151 constituting the first trimming portion 150 of the trimming device 140.

Figure 21:
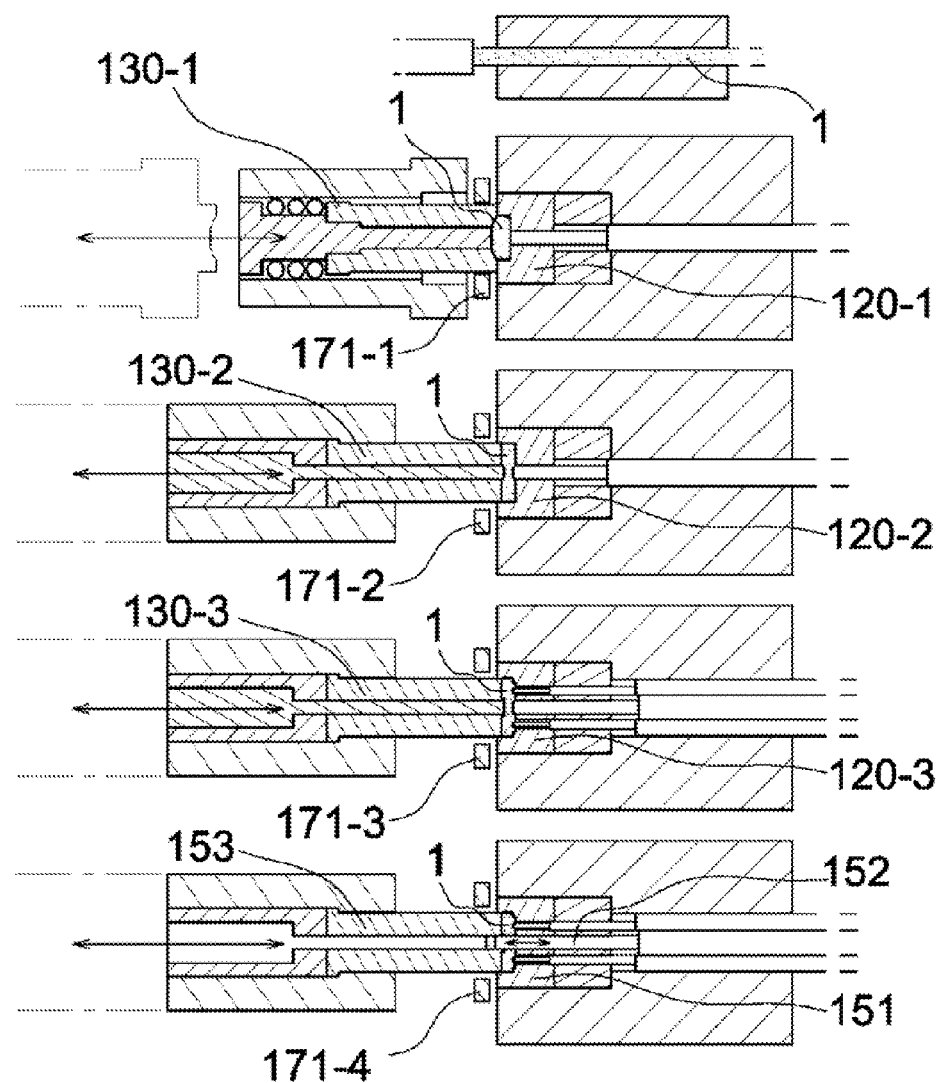
FIG. 21 is a longitudinally sectional view illustrating an operation state of a forming apparatus (first, second and third forging) and a first trimming portion according to the present invention.

As shown in FIG. 21, then, as the first, second and third press dies 130-1, 130-2 and 130-3 constituting the press die portion 130 punch and press a corresponding material 1 and return, the forming is accomplished in the first, second and third fixed dies 120-1, 120-2 and 120-3. Then, in a state that a first moving trimmer 153 constituting the first trimming portion 150 presses the material 1 into a first fixed trimmer 151, a first trimming means 152 of the first fixed trimmer 151 cuts a part of the material 1, which is previously designed, not to meet a standard of a design, and returns.

The first trimming means 152 forms a hole in the material 1 by punching a hole with a diameter slightly smaller than that which is previously designed. In this case, the cutting generally is accomplished while a cut surface is plucked. Accordingly, a fractured surface or a broken line is formed so that the cut surface is not smooth.

Figure 22:
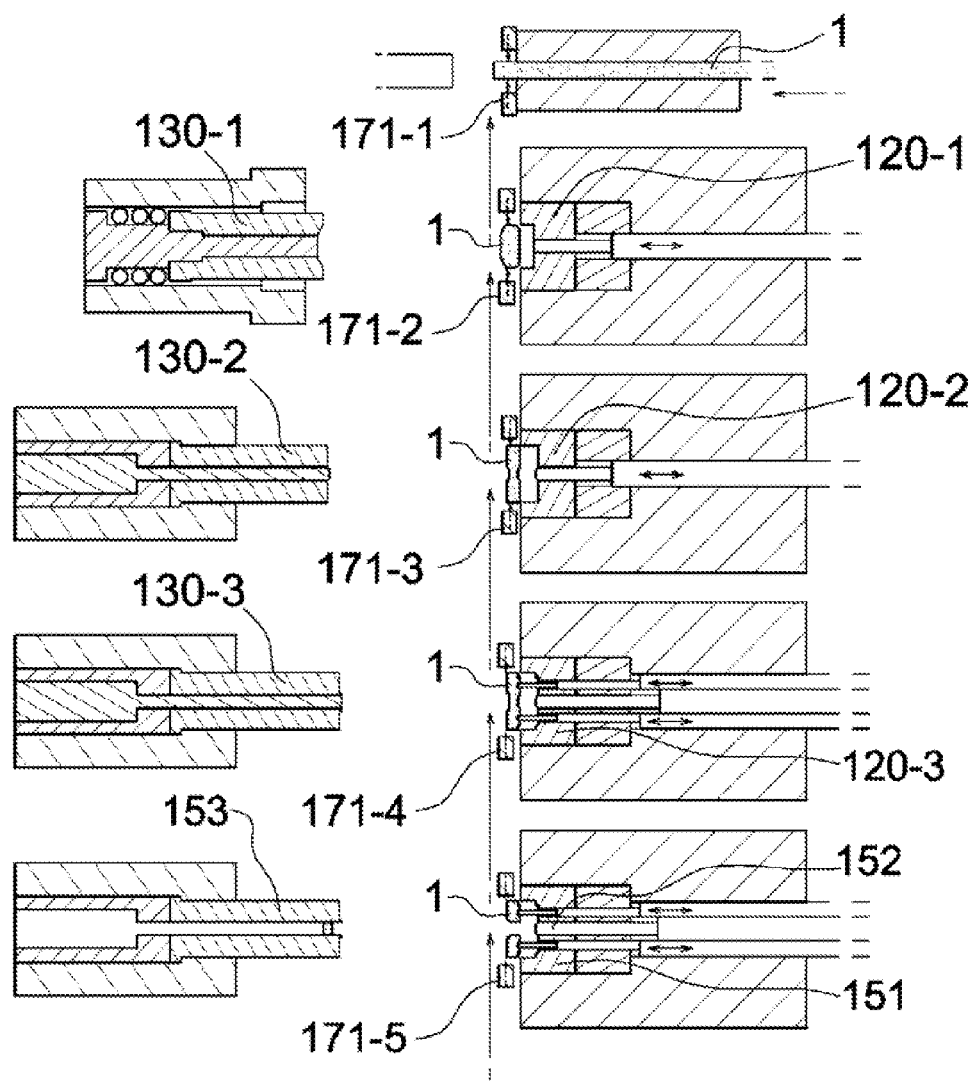
FIG. 22 is a front view illustrating a state that the shifting and supplying portion returns to an initial position to grasp a material to foe introduced next, a material formed in first, second and third steps, and a material firstly trimmed according to the present invention.

As described above, when the forming is achieved in the first, second and third forming steps and a first trimming step, the push rods of the first, second and third fixed dies 120-1, 120-2 and 120-3, and the first fixed trimmer 151 push and remove the materials 1 respectively, as shown in FIG. 22. At this time, the shifting and supplying device 170 returns to an initial position, i.e. the first grip 171-1 moves to the supply portion which continuously supplies the material 1 and performs the above mentioned grasping operation, the second grip 171-2 grips the material 1 which is removed from the first fixed die 120-1, the third grip 171-3 grasps the material 1 which is removed from the second fixed die 120-2, and the fourth grip 171-4 grasps the material 1 which is removed from the third fixed die 120-3. At the same time, the fifth grip 171-5 grasps the material 1 removed from the first fixed trimmer 151.

Figure 23:
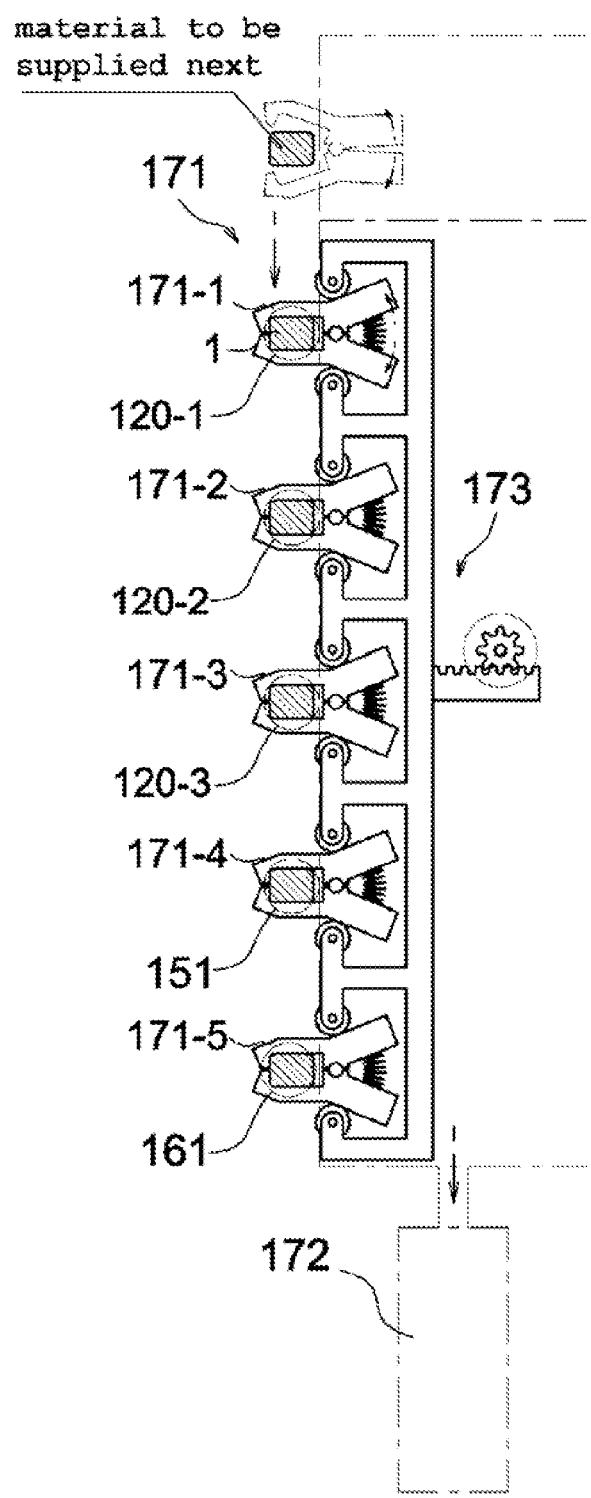
FIG. 23 is a longitudinally sectional view illustrating the shifting operation state (shifting the material to first, second and third forming positions and first and trimming positions) of the shifting and supplying portion according to the present invention.

In the state, as shown in FIG. 23, the shifting means 172 of the shifting and supplying device 170 operates and shifts the materials 1 to a next forming step. In other words, the first grip 171-1 shifts the material 1 to the first fixed die 120-1 which is located at a first forming position, the second grip 2 171-2 moves the material 1 to the second fixed die 120-2 which is placed at a second forming position, the third grip 171-3 moves the material 1 to the third fixed die 120-3 which is placed at a third forming position, the fourth grip 171-4 moves the material 1 to the first fixed trimmer 151 constituting the first trimming portion 150 of the trimming device 140, and the fifth grip 171-5 shifts the material 1 to a second fixed trimmer 161 constituting the second trimming portion 160 of the trimming device 140.

Figure 24:
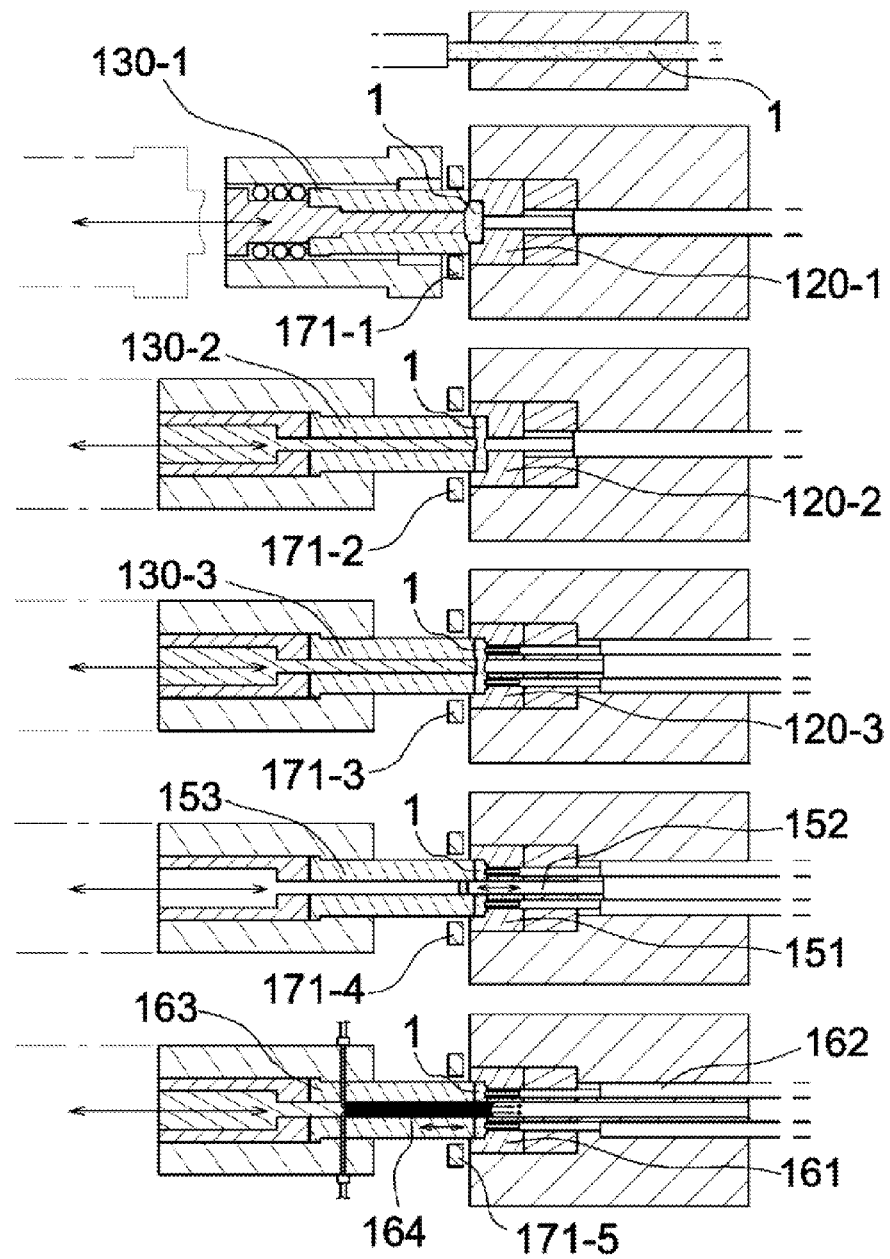
FIG. 24 is a longitudinally sectional view illustrating an operation state of a forming apparatus (first, second and third forging) and first and second trimming portions according to the present invention.

As shown in FIG. 24, then, as the first, second and third press dies 130-1, 130-2 and 130-3 constituting the press die portion 130 punch and press corresponding materials 1 respectively and return, the forming is accomplished in the first, second and third fixed dies 120-1, 120-2 and 10-3. Then, in a state that a first moving trimmer 153 constituting the first trimming portion 150 presses the material 1 into a first fixed trimmer 151, a trimming means 152 of the first fixed trimmer 151 cuts a part of the material 1, which is previously designed, not to meet a standard of a design, and returns. In a state that a second moving trimmer 153 constituting the second trimming portion 160 presses the material 1 into a second fixed trimmer 161, a trimming means 164 of the second fixed trimmer 161 cuts a part of the material 1, which is previously designed, to meet a standard of a design, and returns.

The second trimming means 164 cuts unsmooth parts in a firstly trimmed hole as like a knife to remove a torn surface or a torn line from a surface, so that the cut surface is smooth. In this process, the cut scraps are forcedly discharged by air spraying through a discharging path of the second fixed trimmer 161.

Figure 25:
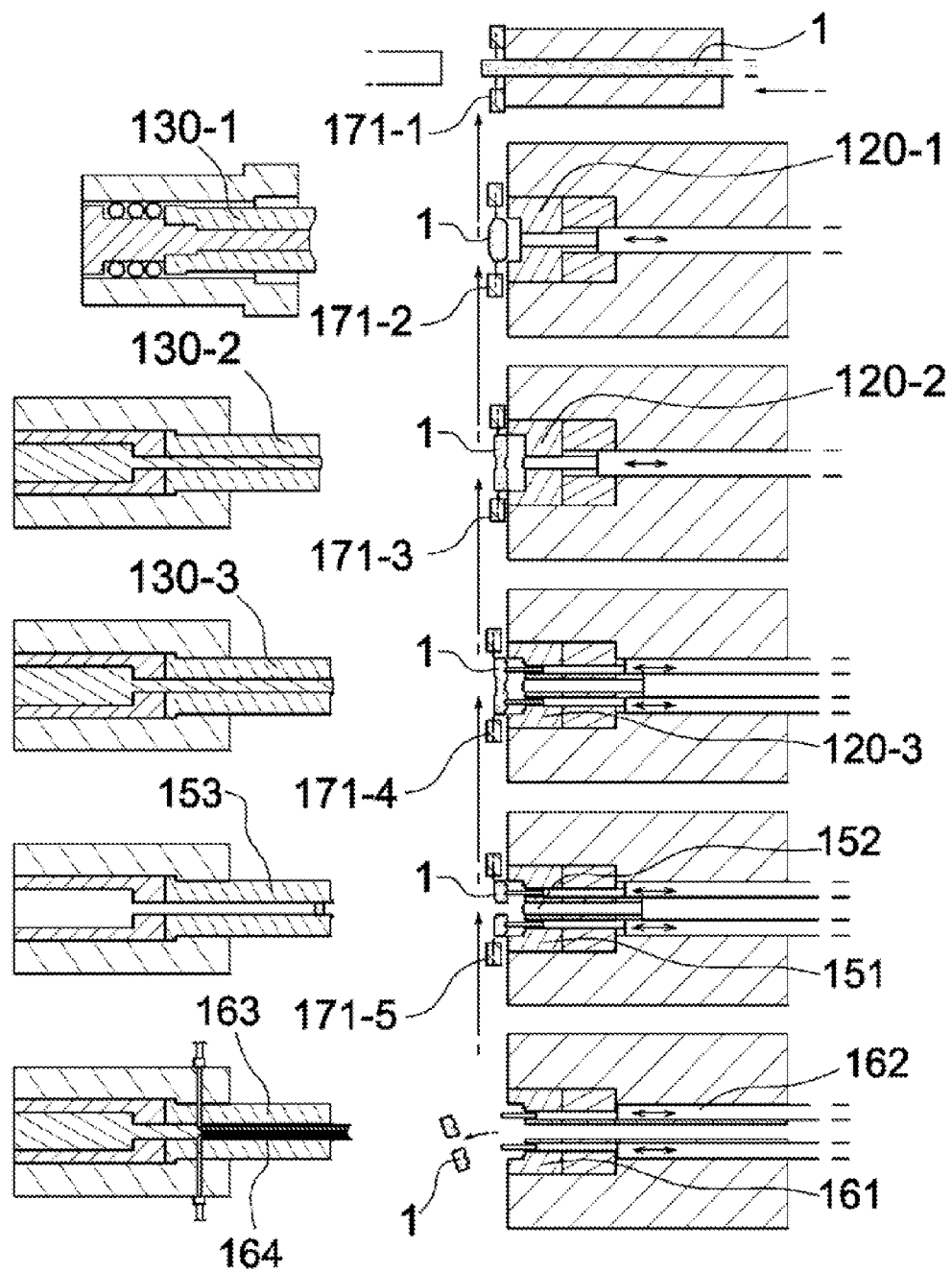
FIG. 25 is a front view illustrating a state that the shifting and supplying portion returns to an initial position and a state that a material secondly trimmed is discharged, according to the present invention.

As described above, when the forming is achieved in the first, second and third steps, and the first and second trimmings are completed, pushing rods of the first, second and third dies 120-1, 120-2 and 120-3, and the first and second fixed trimmers 151 and 161 push and discharge the materials 1 respectively, as shown in FIG. 25. At this time, the pushing rod of the second fixed trimmer 161 pushes and drops the material 1 out of the second fixed trimmer 161, resulting in a discharge of the material 1.

A series of operations as described above are repeatedly performed so that the forming and trimming of the material 1 are simultaneously performed.

As described above, three steps of forming and two steps of trimming are exemplarily illustrated as the embodiment of the present invention. However, forming steps and trimming steps may be added or omitted according to necessity.

| Description of reference numerals | |
|---|---|
| 11: cutting and supplying portion | |
| 11a: supporting die | |
| 11b: transferring die | 11c: stopper |
| 12: first forming device | 13: first press die |
| 14: first fixed die | 15: second press die |
| 16: second fixed die | 17: third press die |
| 18: fixed block | |
| 19: final forming device | 19a: base |
| 19b: clamp | 19c: drill |
| 19d: cutter | |
| 100: battery terminal manufacturing apparatus | |
| 110: forming device | |
| 120: fixed die portion | 130: press die portion |
| 140: trimming device | |
| 150: first trimming portion | |
| 151: first fixed trimmer | |
| 152: first trimming means | |
| 153: first moving trimmer | |

-continued

Description of reference numerals

160: second trimming portion
161: second fixed trimmer
162: discharging means
163: second moving trimmer
164: second trimming means
170: shifting and supplying device
171: grip
172: shifting means
173: grip driving means
1: material to be processed

The invention claimed is:

1. A method of manufacturing a battery terminal plate, in which a material constituted of a volume is formed to have a previously designed shape while being pressed several times, the method comprising the steps of:
- (S10) cutting a material 1, which is continuously supplied, at a predetermined length by a cutting and supplying portion 11 and supplying the cut material to a first processing device 12;
- (S20) firstly forming the cut material 1 with an incomplete shape in such a manner that a first press die 13 presses the cut material 1, which is supplied to the first processing device 12, to a first fixed die 14;
- (S30) secondly forming the cut material 1 with a basic shape in such a manner that a second press die 15 secondly presses the cut material to the first fixed die 14 in a state that the cut material 1 remains in the first fixed die 14 before the basic shaped material 1 is ejected from the first fixed die 14 and moved to a second fixed die 16 so as to be inserted in the second fixed die 16;
- (S40) thirdly forming the basic shaped material 1 with a complete shape in such a manner that a third press die 17 presses the second fixed die 16 before the complete shaped material 1 is discharged from the second fixed die 16; and
- (S50) fourthly forming a complete battery terminal plate through a trimming process after the complete shaped material 1 is fixed.

2. The method as claimed in claim 1, wherein in the first forming (S20), the first press die 13 presses the material 1 to the first fixed die 14 while buffering the pressing of the first press die 13 using tension force of a spring while forming the material with the incomplete shape, and then the first press die 13 returns to an initial position in a state that the material 1 is inserted in the first fixed die 14.

3. The method as claimed in claim 1, wherein the second forming (S30) comprises the sub-steps of:
- (S31) forming the cut material 1 with a basic shape in such a manner that a fixing block 18 which fixes the first, second and third press dies 13, 15 and 17 in a row makes the second press die 15 move to the first fixed die 14 and press the cut material;
- (S32) shifting the material 1 having the basic shape in such a manner that the second press die 15 removes the material 1 from the first fixed die 14 and shifts the material 1 to the second fixed die 16; and
- (S33) preparing a third processing in which the second press die 15 inserts the material 1 into the second fixed die 16 and returns to an initial position.

4. The method as claimed in claim 1, wherein the thirdly forming (S40) comprises the sub-steps of:
- (S41) forming the material 1 with the complete shape in such a manner that the third press die 17 presses the material 1 to the second fixed die 16, before the third press die 17 returns to an initial position while leaving the material 1 in the second fixed die 16; and
- (S42) discharging the material 1 from the second fixed die 16.

5. The method as claimed in claim 1, wherein in the fourth forming S50, when the materials 1 which are individually supplied are received in the base 19a, the clamps 19b grasp the outer periphery of the material 1, the drill 18c descends downwardly while rotating, so as to form a through hole at the center portion in the material 1, and the cutter 19d operates to cut the upper surface of the material 1 so that the material 1 has a predetermined thickness.

* * * * *